(12) United States Patent
Matoba

(10) Patent No.: US 6,955,860 B2
(45) Date of Patent: Oct. 18, 2005

(54) CONTROL OF START-UP COMBUSTOR FOR FUEL CELL POWER PLANT

(75) Inventor: Tadashi Matoba, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 224 days.

(21) Appl. No.: 10/108,657

(22) Filed: Mar. 29, 2002

(65) Prior Publication Data

US 2002/0146604 A1 Oct. 10, 2002

(30) Foreign Application Priority Data

Apr. 6, 2001 (JP) ........................................ 2001-107919

(51) Int. Cl.$^7$ ............................................. H01M 8/18
(52) U.S. Cl. ............................. 429/20; 429/12; 429/17; 429/22
(58) Field of Search ............................. 429/12, 17, 20, 429/22

(56) References Cited

U.S. PATENT DOCUMENTS

2001/0047622 A1 * 12/2001 Yamaoka et al. ......... 48/197 R
2002/0031450 A1 *  3/2002 Yamashita et al. .......... 422/105
2002/0108309 A1 *  8/2002 Grieve et al. ............. 48/197 R

FOREIGN PATENT DOCUMENTS

| EP | 1 069 637 A2 | 1/2001 |
| EP | 1 186 570 A2 | 3/2002 |
| JP | 2000-63104 | 2/2000 |
| JP | 2000063104 | 2/2000 |
| JP | 2001023656 | 1/2001 |
| JP | 2001158602 | 6/2001 |
| JP | 2002147716 | 5/2002 |
| JP | 2002246046 | 8/2002 |
| WO | WO 02/23659 A1 | 3/2002 |

* cited by examiner

*Primary Examiner*—Dah-Wei Yuan
(74) *Attorney, Agent, or Firm*—McDermott Will & Emery LLP

(57) ABSTRACT

In a fuel cell system, a start-up combustor (10) combusts a gaseous mixture of fuel supplied by an injector (15) and air supplied from a valve (12C) at a rich air-fuel ratio, and supplies high temperature combustion gas to a reformer (3) in order to activate the reforming catalyst. After completion of activation, the controller (50) stops supply of air by the valve (12C) and thereafter stops the fuel supply by the injector (15). During this delay period, combustion of fuel using residual air is performed at a rich air-fuel ratio by increasing the fuel supply amount of the injector (15). Thus it is possible to prevent temperature increase of the combustion gas as a result of the gaseous mixture approaching a stoichiometric air-fuel ratio after stopping fuel supply.

14 Claims, 20 Drawing Sheets

14, 18 FLOW CONTROL VALVE
15, 16 FUEL INJECTOR
21, 22, 23, 24 TEMPERATURE SENSOR
25 PRESSURE SENSOR
26 CONCENTRATION SENSOR
28 GLOW PLUG 14, 18 FLOW CONTROL VALVE
15, 16 FUEL INJECTOR
21, 22, 23, 24 TEMPERATURE SENSOR
25 PRESSURE SENSOR
26 CONCENTRATION SENSOR
28 GLOW PLUG 15, 16 FUEL INJECTOR
21, 22, 23, 24 TEMPERATURE SENSOR
25 PRESSURE SENSOR
26 CONCENTRATION SENSOR
28 GLOW PLUG 15, 16 FUEL INJECTOR
21, 22, 23, 24 TEMPERATURE SENSOR
25 PRESSURE SENSOR
26 CONCENTRATION SENSOR
28 GLOW PLUG 14, 18 FLOW CONTROL VALVE
15, 16 FUEL INJECTOR
21, 22, 23, 24 TEMPERATURE SENSOR
25 PRESSURE SENSOR
26 CONCENTRATION SENSOR
28 GLOW PLUG

CONTROL OF START-UP COMBUSTOR FOR FUEL CELL POWER PLANT

FIELD OF THE INVENTION

This invention relates to warming up of a reformer for a fuel cell power plant.

BACKGROUND OF THE INVENTION

In a fuel cell power plant using a hydrogen-rich gas generated by reforming gasoline or methanol by a reformer, it is necessary to promptly warm up the reformer when the power plant starts to operate.

Tokkai 2000-63104 published by the Japanese Patent Office in 2000 discloses a start-up combustor which promotes the warm-up of the reformer by providing a high temperature gas generated by combustion of fuel. The combustor uses glow plug to ignite fuel injected into a combustion chamber from a fuel injector and transfers the resultant combustion gas to the reformer so as to activate a reforming catalyst in the reformer.

Once the reforming catalyst is activated by the high temperature combustion gas, the reforming catalyst maintains an activation temperature with the heat of reactions resulting from reforming vaporized fuel. Consequently heating with the combustion gas is no longer necessary. When the reforming catalyst reaches an activation temperature, the start-up combustor stops fuel injection by the fuel injector.

SUMMARY OF THE INVENTION

Even when the fuel injection by the fuel injector is stopped, combustion in the combustion chamber does not immediately stop due to residual encompassed fuel in the combustion chamber.

When combustion in the combustion chamber during warm-up is performed under a rich air-fuel ratio, the air-fuel ratio varies from rich to lean after fuel injection is stopped as encompassed fuel is combusted.

Providing that the amount of fuel is reduced from a rich air-fuel ratio with a constant air supply, combustion gas having a maximum temperature is produced when the air-fuel ratio falls to a stoichiometric air-fuel ratio.

As a result, due to combustion of the residual fuel after fuel injection is stopped, the temperature of the combustion gas may undergo a large increase. If such a high-temperature combustion gas is transferred to the reforming catalyst which has already reached the activation temperature, the temperature of the reforming catalyst may exceed the activation temperature range and the performance of the catalyst may be adversely affected.

It is therefore an object of this invention to prevent the combustor from generating an excessive heat after the fuel injection is stopped.

In order to achieve the above object, this invention provides a fuel cell power plant performing power generation using a hydrogen-containing reformate gas.

The power plant comprises a reformer comprising a reforming catalyst which generates the hydrogen-containing reformate gas from a source material in a predetermined activation temperature range, a start-up combustor which combusts a gaseous mixture of fuel and air and supplies a resultant combustion gas to the reformer to warm up the reformer to an activation temperature range, an air supply device which supplies air to the start-up combustor, a fuel supply device which supplies fuel to the start-up combustor, a sensor which detects completion of warming up of the reformer, and a programmable controller.

The programmable controller is programmed to control a fuel supply amount of the fuel supply device and an air supply amount of the air supply device to maintain an air-fuel ratio of the gaseous mixture at a predetermined value other than a stoichiometric air-fuel ratio, and control the fuel supply amount of the fuel supply device and the air supply amount of the air supply device to cause a difference of the stoichiometric air-fuel ratio and the air-fuel ratio of the gaseous mixture to be greater than a difference of the predetermined value and the stoichiometric air-fuel ratio, in the period after completion of warming up of the reformer until a combustion of the gaseous mixture terminates.

According to a preferable aspect of this invention, the programmable controller is programmed to control a fuel supply amount of the fuel supply device and an air supply amount of the air supply device to maintain an air-fuel ratio of the gaseous mixture at a predetermined rich air-fuel ratio, stop air supply of the air supply device after completion of warm up of the reformer, and control the fuel supply device to temporarily increase the fuel supply amount of the fuel supply device until stopping fuel supply of the fuel supply device.

This invention also provides a control method for a fuel cell power plant performing power generation using a hydrogen-containing reformate gas, wherein the fuel cell power plant comprises a reformer comprising a reforming catalyst which generates the hydrogen-containing reformate gas from a source material in a predetermined activation temperature range, a start-up combustor which combusts a gaseous mixture of fuel and air and supplies a resultant combustion gas to the reformer to warm up the reformer to an activation temperature range, an air supply device which supplies air to the start-up combustor, and a fuel supply device which supplies fuel to the start-up combustor.

The method comprises detecting completion of warming up of the reformer, controlling a fuel supply amount of the fuel supply device and an air supply amount of the air supply device to maintain an air-fuel ratio of the gaseous mixture at a predetermined value other than a stoichiometric air-fuel ratio, and controlling the fuel supply amount of the fuel supply device and the air supply amount of the air supply device to cause a difference of the stoichiometric air-fuel ratio and the air-fuel ratio of the gaseous mixture to be greater than a difference of the predetermined value and the stoichiometric air-fuel ratio, in the period after completion of warming up of the reformer until a combustion of the gaseous terminates.

The details as well as other features and advantages of this invention are set forth in the remainder of the specification and are shown in the accompanying drawings.

DESCRIPTION OF THE PREFERRED EMBODIMENTS

Figure 1:
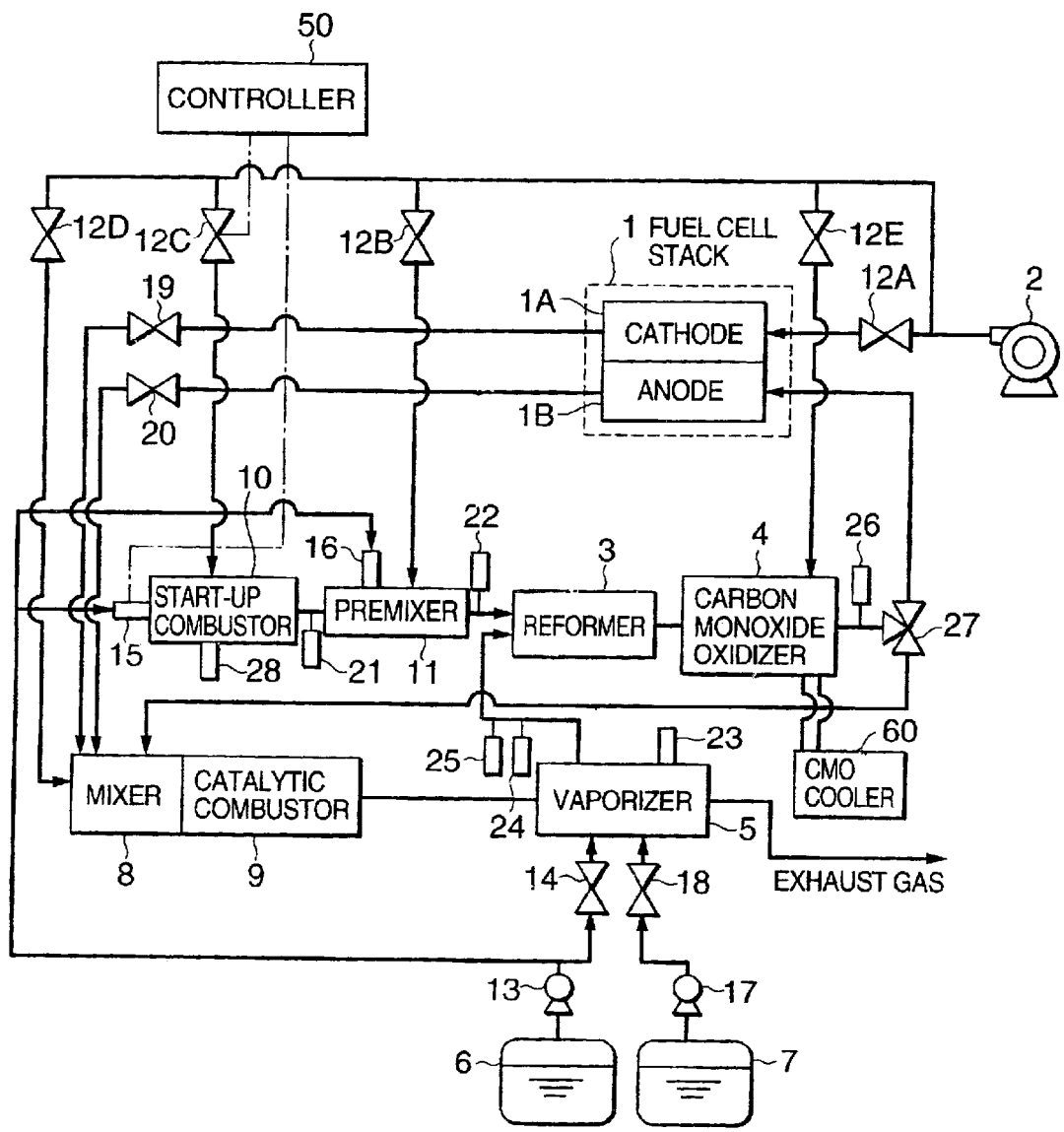
FIG. 1 is a schematic diagram of a fuel cell power plant according to this invention.

Referring to FIG. 1 of the drawings, a fuel cell power plant for a vehicle comprises a fuel cell stack 1, a compressor 2, a reformer 3, a carbon monoxide oxidizer 4, a vaporizer 5, a methanol tank 6, a water tank 7, a catalytic combustor 9, a start-up combustor 10 and a premixer 11.

The fuel cell stack 1 comprises laminated polymer electrolyte fuel cells (PEFC). Each cell is provided with an anode 1B and a cathode 1A. Power is generated using hydrogen-rich gas applied to the anode 1B and air applied to the cathode 1A. A hydrogen-containing anode effluent produced by the anode 1B and an oxygen-containing cathode effluent produced by the cathode 1A are respectively discharged during power generation. The hydrogen-containing anode effluent and the oxygen-containing cathode effluent are supplied by respective flow control valves 20, 19 to a mixer 8 with which the catalytic combustor 9 is provided.

The compressor 2 supplies air to the cathode 1A through a valve 12A. The compressor 2 also supplies air to the premixer 11 through a valve 12B, to the start-up combustor 10 through a valve 12C and to the mixer 8 through a valve 12D.

The methanol tank 6 stores liquid methanol as a source material for reforming. The methanol in the methanol tank 6 is pressurized by a methanol pump 13 and supplied to a vaporizer 5 through a flow control valve 14. The methanol pump 13 also supplies methanol to the premixer 11 and the start-up combustor 10.

The water tank 7 stores water. The water in the water tank 7 is supplied to the vaporizer 5 through a flow control valve 18 from a water pump 17.

The mixer 8 supplies gaseous mixture of hydrogen-containing anode effluent and oxygen-containing cathode effluent or gaseous mixture of air and reformate gas to the catalytic combustor 9. The catalytic combustor 9 performs catalytic combustion of the gaseous mixture and supplies the heat of combustion to the vaporizer 5.

The vaporizer 5 uses the heat of combustion in order to vaporize water supplied from a water pump 17 and methanol supplied from the methanol pump 13. The resulting gaseous mixture of methanol and water is then supplied to the reformer 3.

A reforming catalyst stored in the reformer 3 employs partial oxidation reactions and steam reforming reactions on the gaseous mixture of water, methanol and air supplied through the valve 12B in order to generate reformate gas. The partial oxidation reactions comprise exothermic reactions which allow maintenance of activation temperature of the reforming catalyst once activated. The steam reforming reactions comprise endothermic reactions which uses the heat generated by the partial oxidation reactions.

The carbon monoxide oxidizer 4 of this embodiment is designed as a heat exchanger in which an oxidizing catalyst is incorporated. The oxidizing catalyst performs preferential oxidation reactions on the reformate gas mixed with air supplied from a valve 12E in order to produce hydrogen-rich gas by removing carbon monoxide (CO) from the reformate gas. The resulting hydrogen-rich gas is supplied to the anode 1B of the fuel cell stack 1 or to the mixer 8 of the catalytic combustor 9 through a switching valve 27. These preferential oxidation reactions are also exothermic and allow maintenance of activation temperature of the reforming catalyst once activated.

Excess heat generated by the preferential oxidation reactions is cooled by the coolant supplied from a carbon monoxide oxidizer cooler (CMO cooler) 60.

When the power plant starts to operate, high-temperature combustion gas is supplied to the reformer 3 from the start-up combustor 10 in order to activate the reforming catalyst of the reformer 3. The start-up combustor 10 is provided with a fuel injector 15 and a glow plug 28. The start-up combustor 10 performs combustion by igniting a gaseous mixture of methanol injected from the fuel injector 15 and air supplied from the valve 12C with a glow plug 28 and supplies the combustion gas to the premixer 11.

The premixer 11 is provided with a fuel injector 16. The premixer 11 produces a gaseous mixture of the combustion gas supplied from the start-up combustor 10 and methanol injected from the fuel injector 16. Further, it mixes the gaseous mixture with air supplied from the valve 12B.

The premixer 11 also lowers the temperature of the gaseous mixture so as to be lower than a heat-resistant temperature of the reforming catalyst of the reformer 3 through the above mixing process. The resulting gaseous mixture is supplied to the reformer 3.

The control of the power plant including control during start-up using the start-up combustor 10 and the premixer 11 is performed by signals output from a controller 50.

The controller 50 comprises a microcomputer or plural microcomputers each of which is provided with a central processing unit (CPU), a read only memory (ROM), a random access memory (RAM) and an input/output interface (I/O interface).

In order to perform the above control, signals are input to the controller 50 from a temperature sensor 21 which detects the temperature of the combustion gas produced by the start-up combustor 10, a temperature sensor 22 which detects the temperature of the gaseous mixture produced by the premixer 11, a temperature sensor 23 which detects the temperature of the vaporizer 5, a temperature sensor 24 which detects the temperature of the gaseous mixture supplied to the reformer 3 from the vaporizer 5, a pressure sensor 25 which detects the pressure of the gaseous mixture supplied from the vaporizer 5 to the reformer 3, and a concentration sensor 26 which detects the concentration of CO in the hydrogen-rich gas produced by the carbon monoxide oxidizer 4.

The start-up operation of the fuel cell power plant is summarized as follows.

Firstly rich gaseous mixture is produced by supplying air to the start-up combustor 10 by operating the compressor 2 and injecting fuel into the start-up combustor 10 from the fuel injector 15 by operating the methanol pump 13. The rich gaseous mixture is combusted by ignition with the glow plug 28. The controller 50 determines whether or not the start-up combustor 10 has reached a flame stabilization temperature based on the temperature of the combustion gas detected by the temperature sensor 21. When the start-up combustor 10 reaches the flame stabilization temperature, the controller 50 stops ignition using the glow plug 28. In contrast, fuel injection by the fuel injector 15 is continued.

The premixer 11 produces the gaseous mixture by mixing the combustion gas supplied from the start-up combustor 10 with methanol and air such that the methanol concentration and temperature of the mixture are suitable for reforming operations and supplies the gaseous mixture to the reformer 3. The temperature of the reforming catalyst in the reformer 3 rises towards the activation temperature range due to the heat of gaseous mixture.

The activated reforming catalyst reforms the gaseous mixture by partial oxidation and supplies the resultant reformate gas to the carbon monoxide oxidizer 4. The oxidizing catalyst of the carbon monoxide oxidizer 4 is activated by the heat from the reformate gas supplied from the reformer 3.

However, at an early stage of the start-up operation, the oxidizing catalyst of the carbon monoxide oxidizer 4 is not fully activated, so the switching valve 27 maintains a position in which the carbon monoxide oxidizer 4 is connected to the mixer 8 of the catalytic combustor 9.

The mixer 8 mixes gas flowing from the carbon monoxide oxidizer 4 with air from the valve 12D and supplies the gaseous mixture to the catalytic combustor 9. The catalytic combustor 9 performs catalytic combustion of the gaseous mixture and supplies the heat of combustion to the vaporizer 5.

When the vaporizer 5 is sufficiently warmed up by the heat of combustion, the methanol pump 13 starts to supply methanol to the vaporizer 5 via the flow control valve 14 and the water pump 17 starts to supply water to the vaporizer 5 via the flow control valve 18. The vaporizer 5, using the heat of combustion, vaporizes methanol and water, and the resulting gaseous mixture of water vapor and methanol vapor is supplied to the reformer 3.

The temperature of this gaseous mixture detected by the temperature sensor 24 and the pressure of the gaseous mixture detected by the pressure sensor 25 respectively rise as the vaporizer 5 becomes fully functional. When the controller 50 determines the establishment of the reforming cycle of fuel through the vaporizer 5, the reformer 3, the carbon monoxide oxidizer 4 and the catalytic combustor 9 based on the input signals from the above sensors, the supply of methanol to the premixer 11 and the supply of air and methanol to the start-up combustor 10 are stopped.

Thereafter the controller 50 continues operation of the fuel cell power plant with this reforming cycle and determines whether or not the CO concentration detected by the concentration sensor 26 has reached a concentration suitable for supply to the fuel cell stack 1 as a hydrogen-rich gas. When the CO concentration falls to the concentration suitable for supply to the fuel cell stack 1, the controller 50 switches the switching valve 27, and initiates power generation in the fuel cell stack 1 by supplying hydrogen-rich gas to the anode 1B of the fuel cell stack 1 and supplying air to the cathode 1A of the fuel cell stack 1 through the valve 12A from the compressor 2.

When the injection of methanol in the start-up combustor 10 is stopped, as described above, it is necessary to avoid the production of high-temperature combustion gas after stopping injection.

Figure 2:
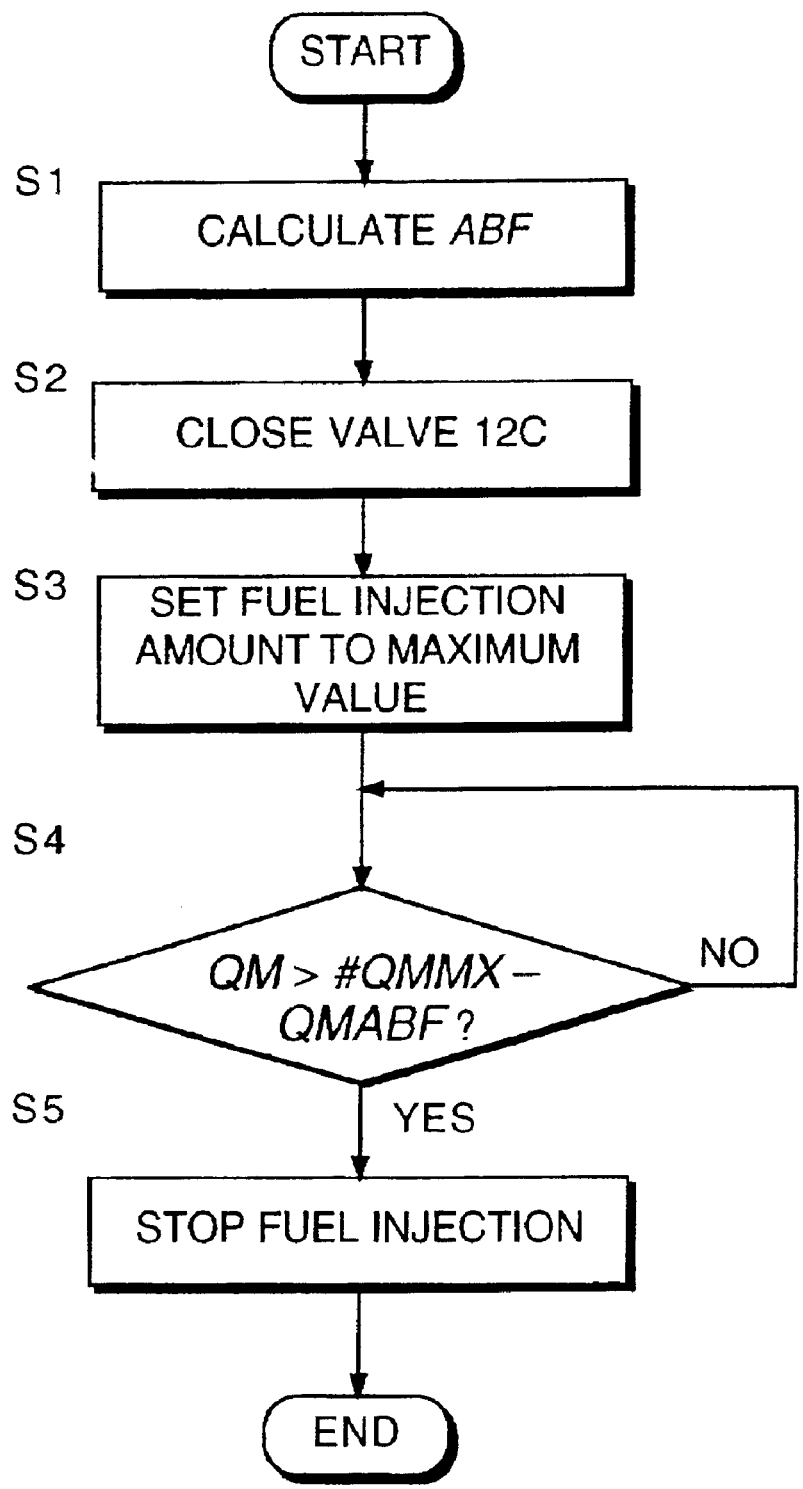
FIG. 2 is a flowchart describing a stopping routine of the start-up combustor performed by a controller according to this invention.

The controller 50 prevents the production of high-temperature combustion gas after stopping fuel injection by performing a stopping routine of the start-up combustor 10 shown in FIG. 2. This routine is performed on only a single occasion when the controller 50 stops the operation of the start-up combustor 10.

Firstly in a step S1, the controller 50 calculates a current air-fuel ratio ABF in the start-up combustor 10 from the opening of the valve 12C and the fuel injection signal to the fuel injector 15.

Then in a step S2, the valve 12C is closed and the supply of air to the start-up combustor 10 is stopped. Even when the valve 12C is closed, residual air continues to exist along the passage from the valve 12C to the start-up combustor 10.

In a next step S3, the controller 50 sets the fuel injection amount of the fuel injector 15 to a maximum value.

In a next step S4, the controller 50 determines whether or not the following relation has been established.

$$QM > \#QMMX - QMABF$$

Where, QM=the summed injection amount after starting increase of the fuel injection amount in the step S3,
QMMX=fuel amount required for regulating the air-fuel ratio in the start-up combustor 10 to be equal to a rich combustion limit=a constant, and
QMABF=fuel amount in the start-up combustor 10 corresponding to the air-fuel ratio ABF The rich combustion limit of methanol corresponds to the air-fuel ratio of approximately 1.6.

In the above relationship, an amount of additional fuel required to increase the air-fuel ratio from ABF to the rich combustion limit is first calculated, and then it is determined whether or not the amount of fuel injected after closing the valve 12C has reached the calculated amount.

The controller 50 maintains the fuel injection amount of the fuel injector 15 to a maximum value until the above relationship is satisfied.

When the relationship is established, in a step S5 the controller 50 stops fuel injection by the fuel injector 15 and terminates the routine.

Next, referring to FIGS. 3A–3D, variation in the air-fuel ratio in the start-up combustor 10 resulting from this control will be described.

Figure 3A:
FIGS. 3A–3C are timing charts describing air-fuel ratio variation in the start-up combustor due to the execution of the routine of FIG. 2.
Figure 3B:
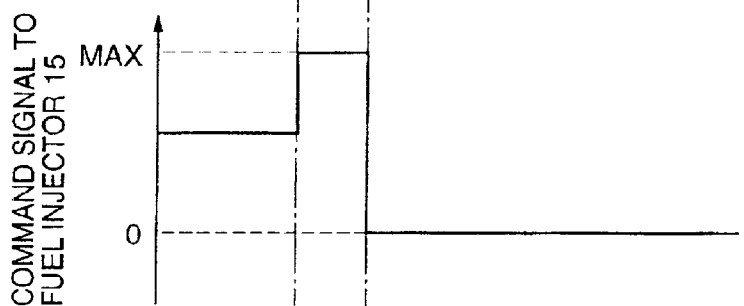
Figure 3C:
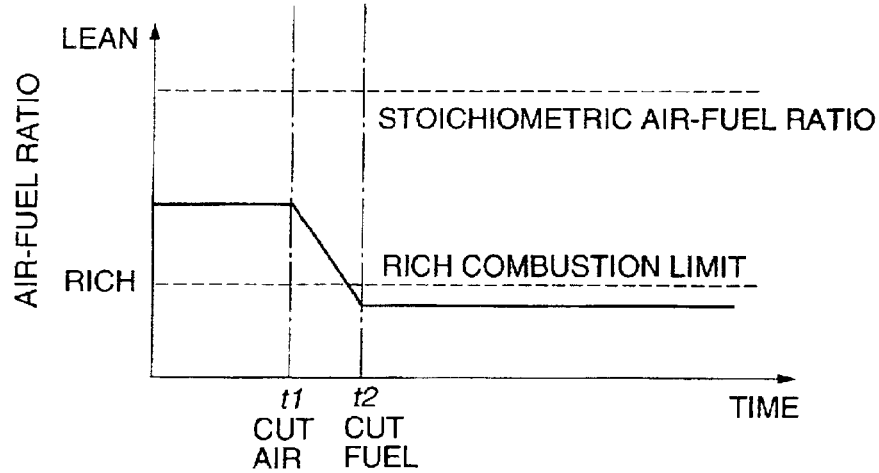

When the start-up combustor 10 operates to warm up the reformer 3, the controller 50 outputs a command signal to the valve 12C to maintain a predetermined opening as shown in FIG. 3A, and outputs a command signal to the fuel injector 15 to inject a predetermined amount of fuel as shown in FIG. 3B. As a result, a gaseous mixture of rich air-fuel ratio as shown in FIG. 3C is combusted in the start-up combustor 10 and resultant high-temperature combustion gas is transferred to the reformer 3 via the premixer 11.

At a time t1 when the above reforming cycle is established, the controller 50 outputs a command signal to the air valve 12C to cut off air supply after calculating the air-fuel ratio ABF. However, since residual air continues to exist in the space from the valve 12C to the start-up combustor 10, combustion in the start-up combustor 10 is not immediately stopped. The residual air is consumed by combustion of fuel in the in the start-up combustor 10.

At the same time as the controller 50 closes the valve 12C, the injection amount of the fuel injector 15 is increased to the maximum as shown in FIG. 3B. Consequently as shown in FIG. 3C, combustion is performed at an air-fuel ratio which is richer than that before closure of the air valve 12C. Combustion becomes sluggish as the amount of air decreases, and combustion stops when the air-fuel ratio exceeds a rich combustion limit. At a time t2, when the relationship in the step S4 is established, fuel injection by the fuel injector 15 is stopped.

In this manner, after closing the valve 12C, the air-fuel ratio in the start-up combustor 10 is maintained rich until combustion stops, so temperature increase in the combustion gas immediately after the fuel injection is stopped is prevented.

The reforming catalyst in the reformer 3 which has already activated will therefore not suffer an excessive heat-up due to a contact with combustion gas transferred from the start-up combustor 10.

Apart from starting up the fuel cell power plant, the start-up combustor 10 and premixer 11 may also be used for the purpose of increasing supply amount of gaseous mixture to the reformer 3 when a power generation requirement to the fuel cell stack 1 is sharply increased during normal operation of the power plant.

In this case, it is possible to prevent abnormal temperature increase in the reforming catalyst of the reformer 3 by stopping the start-up combustor 10 with the process above after load becomes stabilized.

Next, referring to FIG. 4 and FIGS. 5A–5C, a second embodiment of this invention will be described.

In this embodiment, the controller 50 controls the fuel injection amount of the fuel injector 15 using the temperature of the combustion gas as a parameter instead of summing the fuel injection amount.

Figure 4:
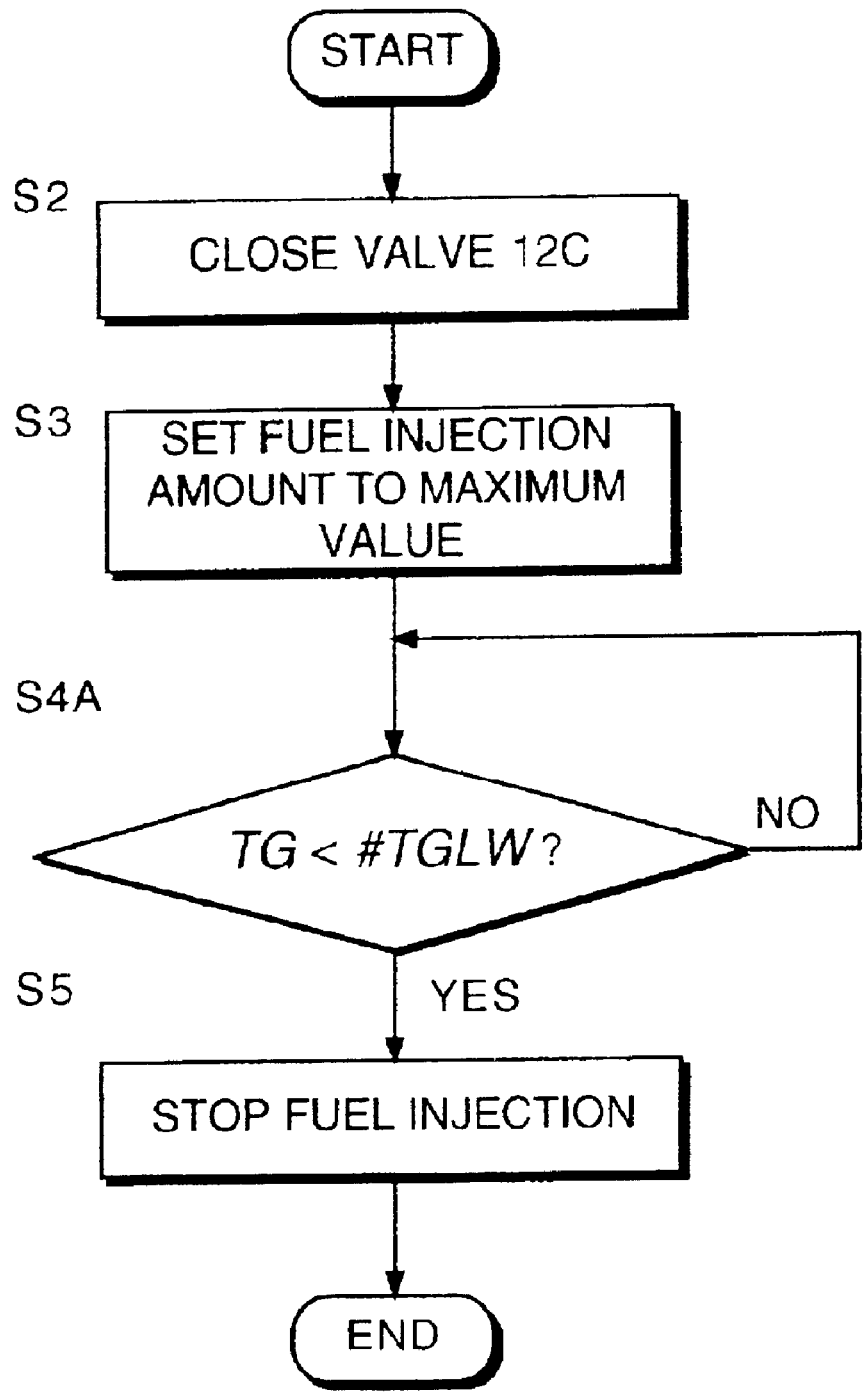
FIG. 4 is a flowchart describing a stopping routine of the start-up combustor performed by a controller according to a second embodiment of this invention.

Specifically, a routine shown in FIG. 4 is performed instead of that shown in FIG. 2 in the first embodiment as the stopping routine for the start-up combustor 10. In this routine, the step S1 in the routine of FIG. 2 is omitted and the step S4 is replaced by a step S4A. The other steps as well as the hardware construction of the fuel cell power plant are the same as those of the first embodiment.

In the step S4A, the controller 50 compares the temperature TG of the combustion gas detected by the temperature sensor 21 with a predetermined temperature #TGLW. The predetermined temperature #TGLW corresponds to the self-ignition temperature of the gaseous mixture. When the combustion temperature TG is lower than the self-ignition temperature, the gaseous mixture tends not to ignite.

Figure 5A:
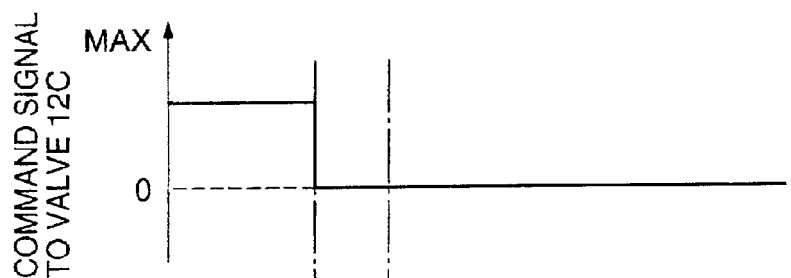
FIGS. 5A–5C are timing charts describing gas temperature variation in the tart-up combustor due to the execution of the routine of FIG. 4.
Figure 5B:
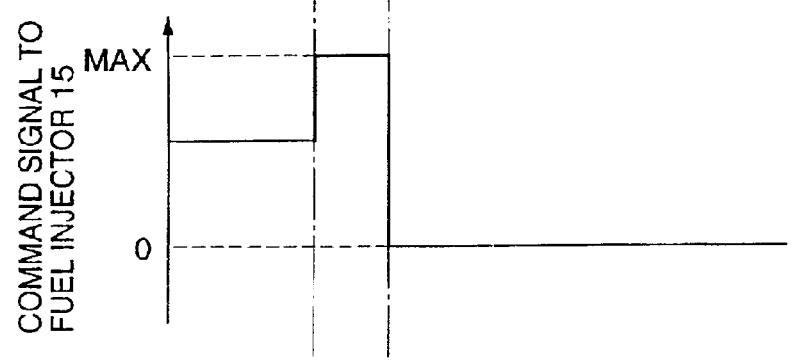
Figure 5C:
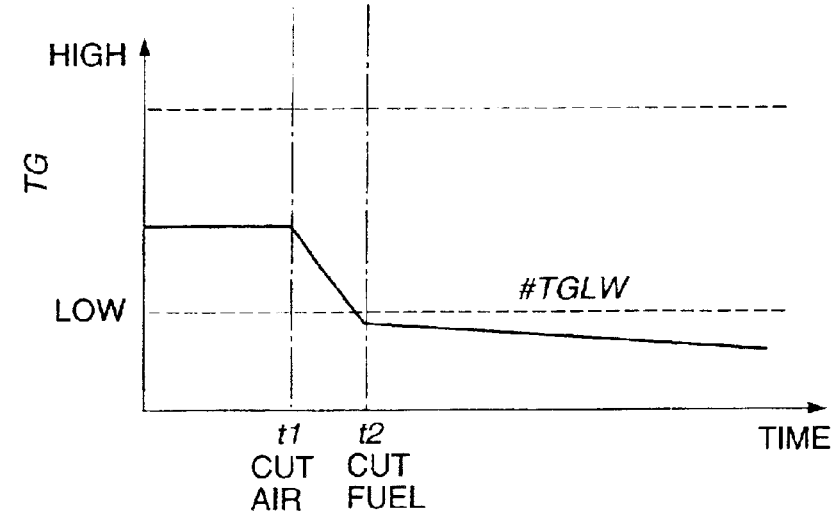

As shown in FIG. 5A, at a time t1, after closing the valve 12C, the fuel injector 15 is controlled to increase the fuel injection amount to the maximum value and maintain it as long as the combustion gas temperature TG is higher than the predetermined temperature #TGL W. Fuel injection is stopped at a time t2 when the combustion gas temperature TG becomes lower than the predetermined temperature #TGLW.

The ignition temperature related to catalytic combustion in the start-up combustor 10 depends on the amount of the catalyst in the start-up combustor 10 and the amount of methanol supplied thereto. By properly setting this relation, the ignition temperature not higher than 100° C. is realized.

Providing that the above situation is existing, the predetermined temperature #TGLW is herein set to a value not higher than 100° C. The optimal setting of the predetermined temperature #TGLW may however be obtained through experiments, because the ignition temperature of methanol broadly varies by the specification and the operation condition of the start-up combustor 10.

In the same manner as the first embodiment, this embodiment also prevents temperature increase in the combustion gas immediately after the fuel injection is stopped in the start-up combustor 10.

Figure 6:
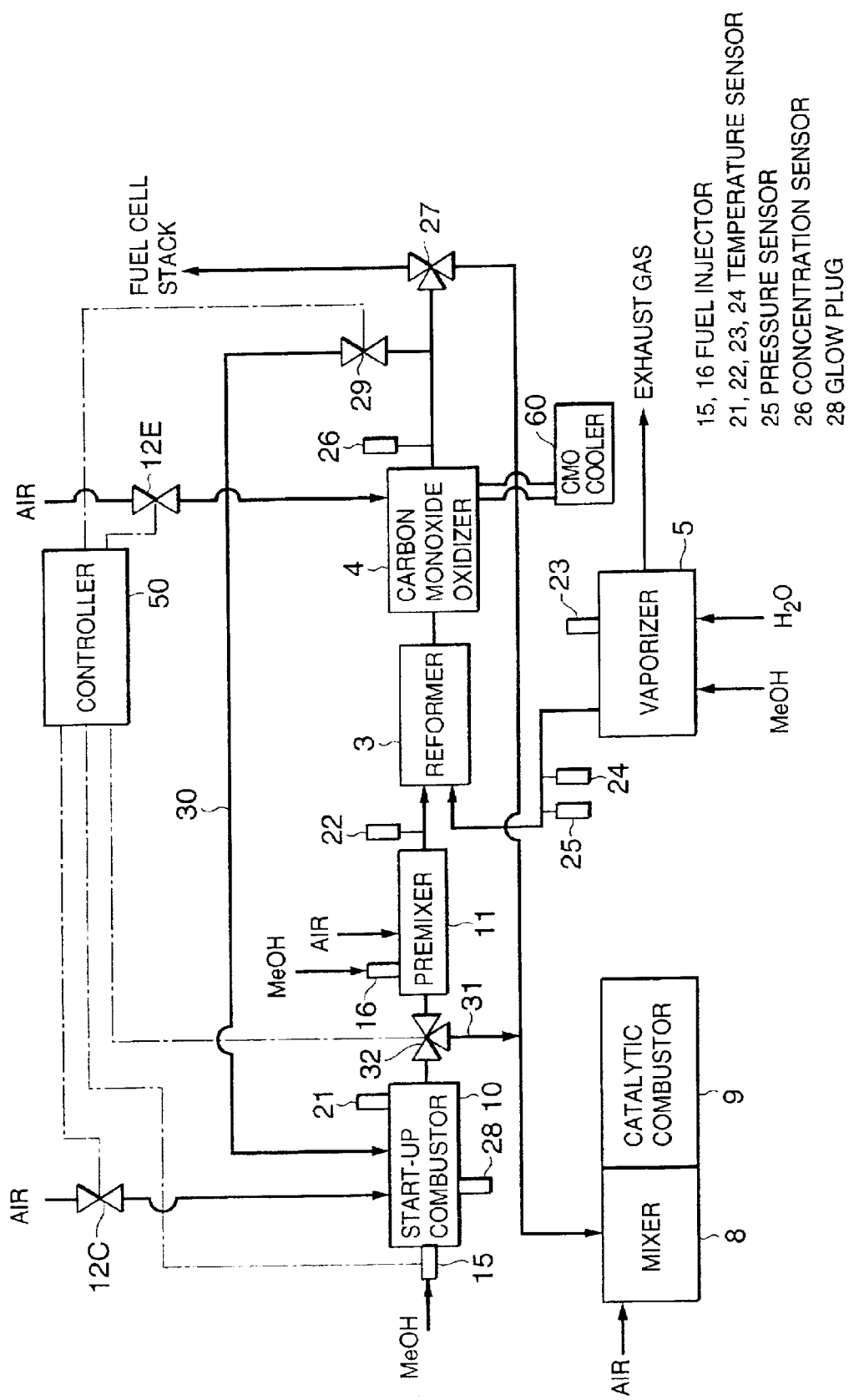
FIG. 6 is a schematic diagram of a fuel cell power plant according to a third embodiment of this invention.
Figure 7:
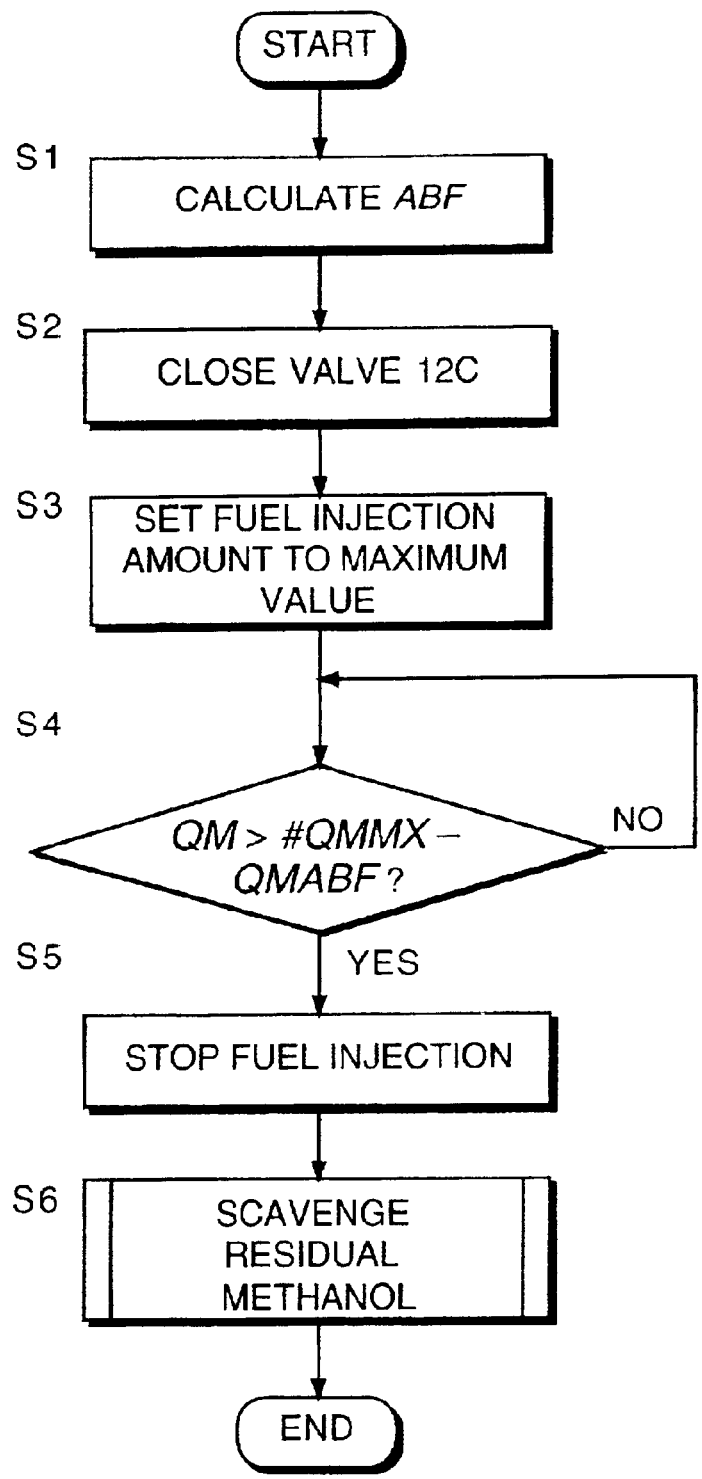
FIG. 7 is a flowchart describing a stopping routine of the start-up combustor performed by a controller according to a third embodiment of this invention.
Figure 8:
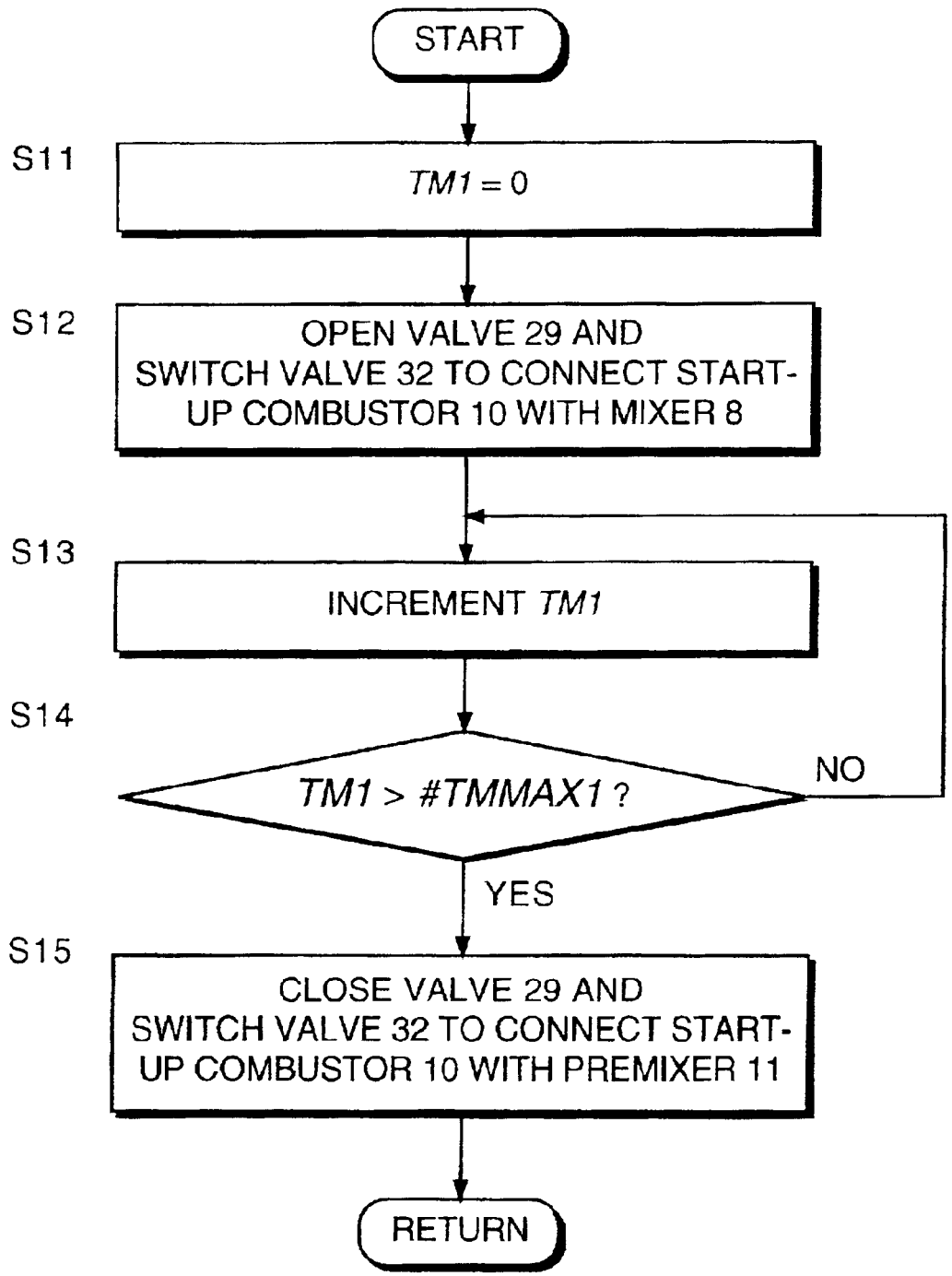
FIG. 8 is a flowchart describing a scavenging routine for residual methanol performed by the controller according to the third embodiment of this invention.

Referring to FIGS. 6 to 8, a third embodiment of this invention will be described.

In this embodiment, after the fuel injector 15 stops injection of methanol in the start-up combustor 10, residual methanol in the start-up combustor 10 is scavenged using hydrogen-rich gas. The scavenged methanol is then supplied to the catalytic combustor 9.

For this purpose, a passage 30 supplying hydrogen-rich gas to the start-up combustor 10 is branched off from a passage connecting the carbon monoxide oxidizer 4 and the switching valve 27. A flow control valve 29 is provided in the passage 30.

Further, a switching valve 32 is provided in a passage from the start-up combustor 10 to the premixer 11 so as to branch off a passage 31 to the mixer 8. These valves 29, 32 are controlled by signals output from the controller 50. The hardware construction of the other part of the fuel cell power plant is the same as that described with reference to the first and second embodiments.

In this embodiment, when stopping operation of the start-up combustor 10, a stopping routine shown in FIG. 7 is performed by the controller 50.

Referring to FIG. 7, the process in the steps S1–S5 is the same as the routine of FIG. 2 according to the first embodiment. However after the controller 50 stops the fuel injection by the fuel injector 15, in a step S6, a subroutine shown in FIG. 8 is performed in order to scavenge residual methanol in the start-up combustor 10.

Referring to FIG. 8, firstly in a step S11, the controller 50 resets a timer value TM1 to a value of zero.

Then in a step S12, the flow control valve 29 is opened and the switching valve 32 is switched so that the start-up combustor 10 is connected to the mixer 8 via the passage 31. Then in a step S13, the timer value TM1 is incremented.

In a step S14, it is determined whether or not the timer value TM1 has exceeded a predetermined value #TMMAX1. The process in the steps S13 and S14 is repeated until the timer value TM1 exceeds the predetermined value #TMMAX1. In the step S14, when the timer value TM1 has exceeded the predetermined value #TMMAX1, the controller 50 closes the flow control valve 29 in a step S15 and switches the switching valve 32 so that the start-up combustor 10 is connected to the premixer 1. The subroutine is terminated after this process and the routine as shown in FIG. 7 is terminated at the same time.

According to this embodiment, after the start-up combustor 10 stops combustion with the air-fuel ratio at the rich combustion limit, hydrogen-rich gas produced by the carbon monoxide oxidizer 4 is supplied to the start-up combustor 10.

Since the temperature of the hydrogen-rich gas is high due to catalytic reactions in the reformer 3 and carbon monoxide oxidizer 4, heat exchange with methanol is performed when the hydrogen-rich gas is introduced in the start-up combustor 10, and the methanol is vaporized due to the heat rendered by the hydrogen-rich gas. The hydrogen-rich gas expels the vaporized methanol to the catalytic combustor 9.

Since the hydrogen-rich gas contains almost no oxygen, residual methanol in the start-up combustor 10 is prevented from combusting even with the heat rendered by the hydrogen-rich gas. The vaporized methanol expelled from the start-up combustor 10 by the hydrogen-rich gas is combusted in the catalytic combustor 9 and heat generated by this combustion is reused to vaporize methanol in the vaporizer 5.

According to this embodiment, in addition to preventing increases in the temperature of the combustion gas immediately after stopping fuel injection in the start-up combustor 10 in the same manner as the first embodiment, it is possible to prevent deterioration of operating performance or ignition characteristics of the start-up combustor 10 due to residual methanol on the next occasion when it is operated.

Figure 9:
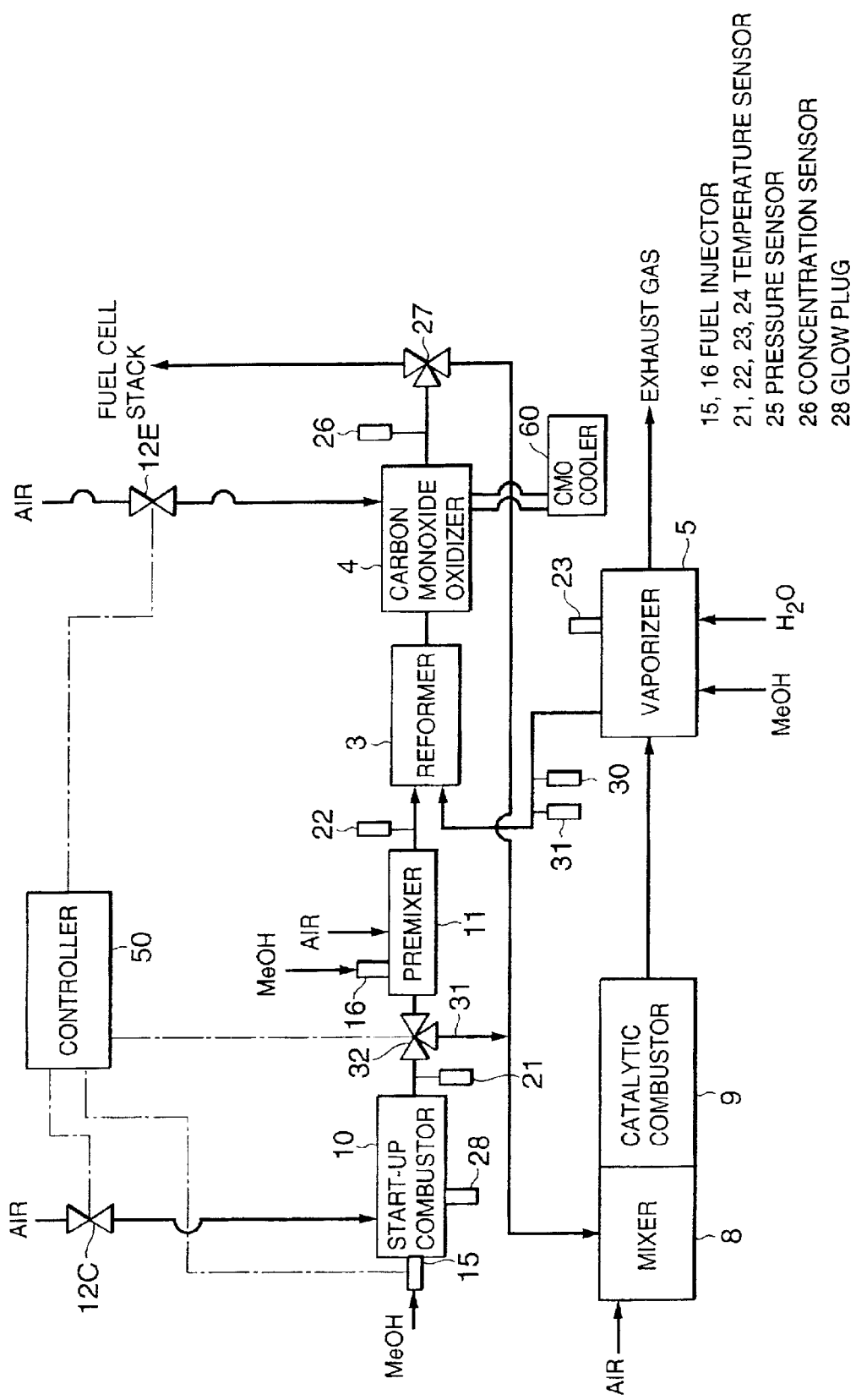
FIG. 9 is a schematic diagram of a fuel cell power plant according to a fourth embodiment of this invention.
Figure 10:
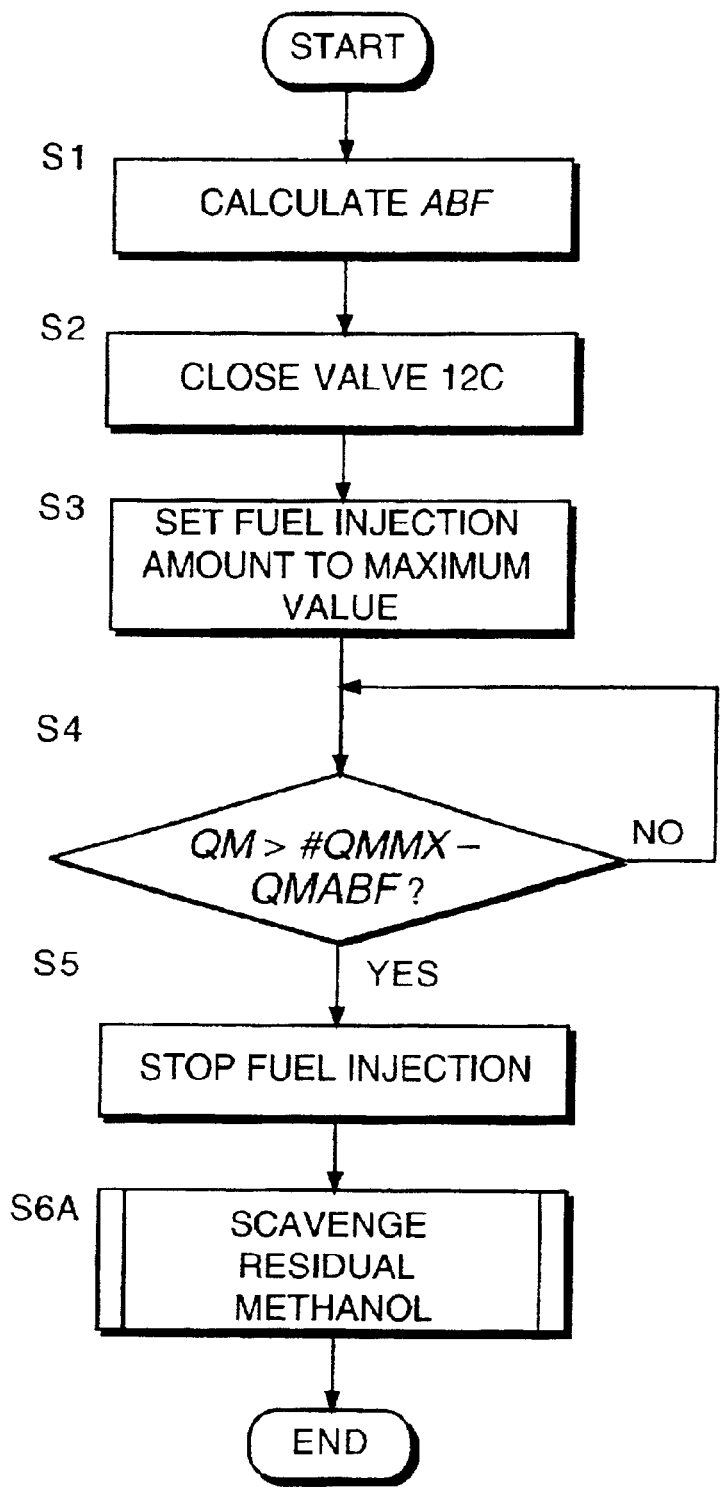
FIG. 10 is a flowchart describing a stopping routine of the start-up combustor performed by a controller according to the fourth embodiment of this invention.
Figure 11:
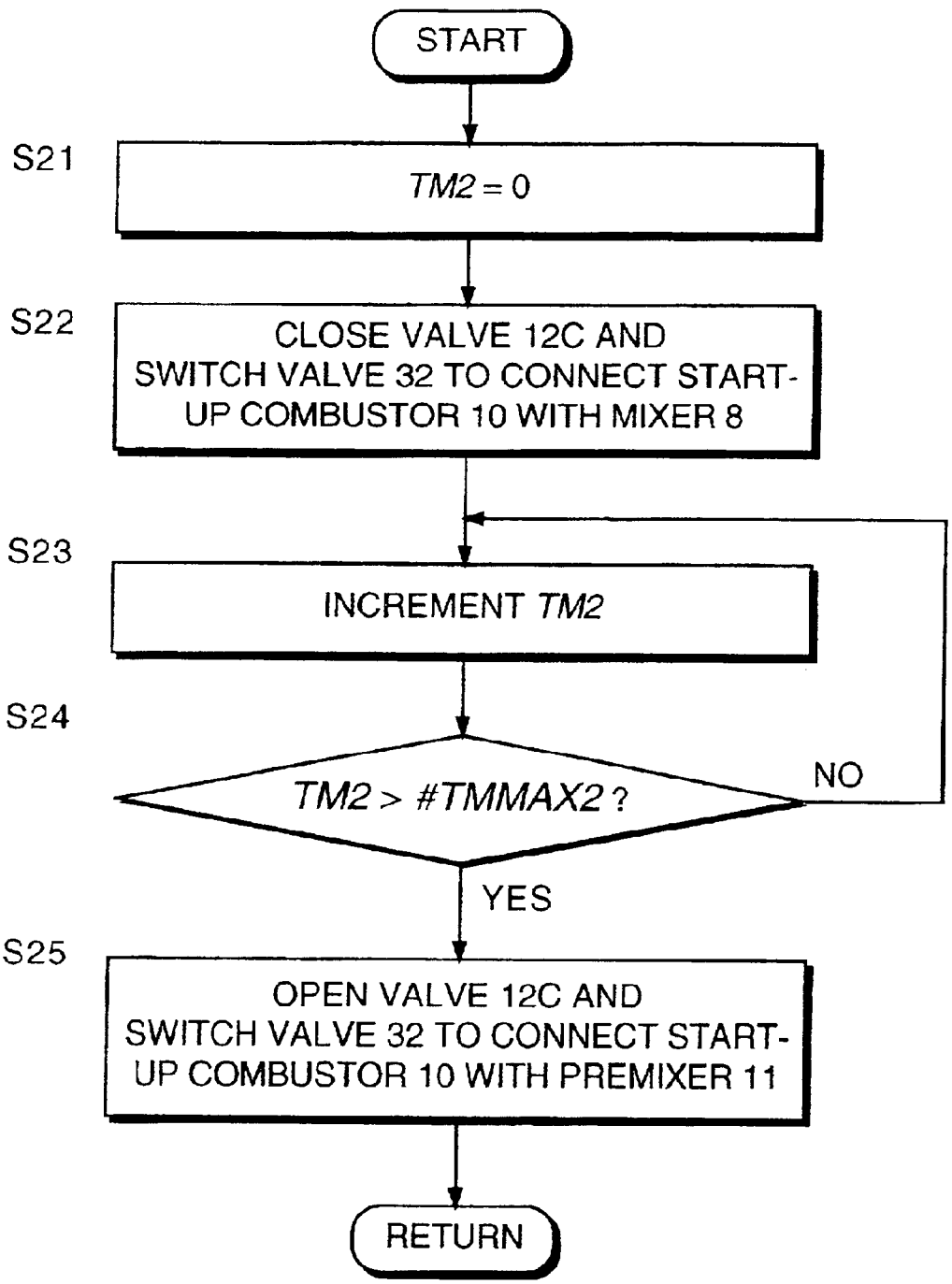
FIG. 11 is a flowchart describing a scavenging routine for residual methanol performed by the controller according to the fourth embodiment of this invention.

Referring to FIGS. 9–11, a fourth embodiment of this invention will be described.

The fuel cell power plant according to this embodiment omits the passage 30 and the flow control valve 29 from the third embodiment. The controller 50 performs a stopping routine shown in FIG. 10 when stopping operation of the start-up combustor 10.

The process in the steps S1–S5 in this routine is the same as the routine of FIG. 2 according to the first embodiment. However after stopping fuel injection by the fuel injector 15 in the step S5, the controller 50 performs a subroutine shown in FIG. 11 in order to scavenge residual methanol in the start-up combustor 10 in a step S6A.

Referring to FIG. 11, the controller 50 first resets the timer value TM2 to a value of zero in a step S21.

Then in a step S22, the valve 12C is opened and the switching valve 32 is switched so that the start-up combustor 10 is connected to the mixer 8 via the passage 31. Then in a step S23, the timer value TM2 is incremented.

In a step S24, it is determined whether or not the timer value TM2 has exceeded a predetermined value #TMMAX2. The process in the steps S23 and S24 is repeated until the timer value TM2 exceeds the predetermined value #TMMAX2. In the step S24, when the timer value TM2 has exceeded the predetermined value #TMMAX2, the controller 50 closes the valve 12C in a step S25 and switches the switching valve 32 so that the start-up combustor 10 is connected to the premixer 11. The subroutine is terminated after this process and the routine of FIG. 10 is terminated at the same time.

According to this embodiment, after the start-up combustor 10 stops combustion with the air-fuel ratio at the rich combustion limit, air from the valve 12C is re-supplied to the start-up combustor 10. The air supplied to the start-up combustor 10 quickly reduces the temperature of the start-up combustor 10 and residual methanol in the start-up combustor 10 is expelled to the mixer 8 and combusted in the catalytic combustor 9. Heat resulting from the combustion of residual methanol in the catalytic combustor 9 is reused to vaporize methanol in the vaporizer 5.

This embodiment has a simpler structure than the third embodiment, but still prevents deterioration of operating performance or ignition characteristics of the start-up combustor 10 due to residual methanol on the next occasion when it is operated.

Figure 12:
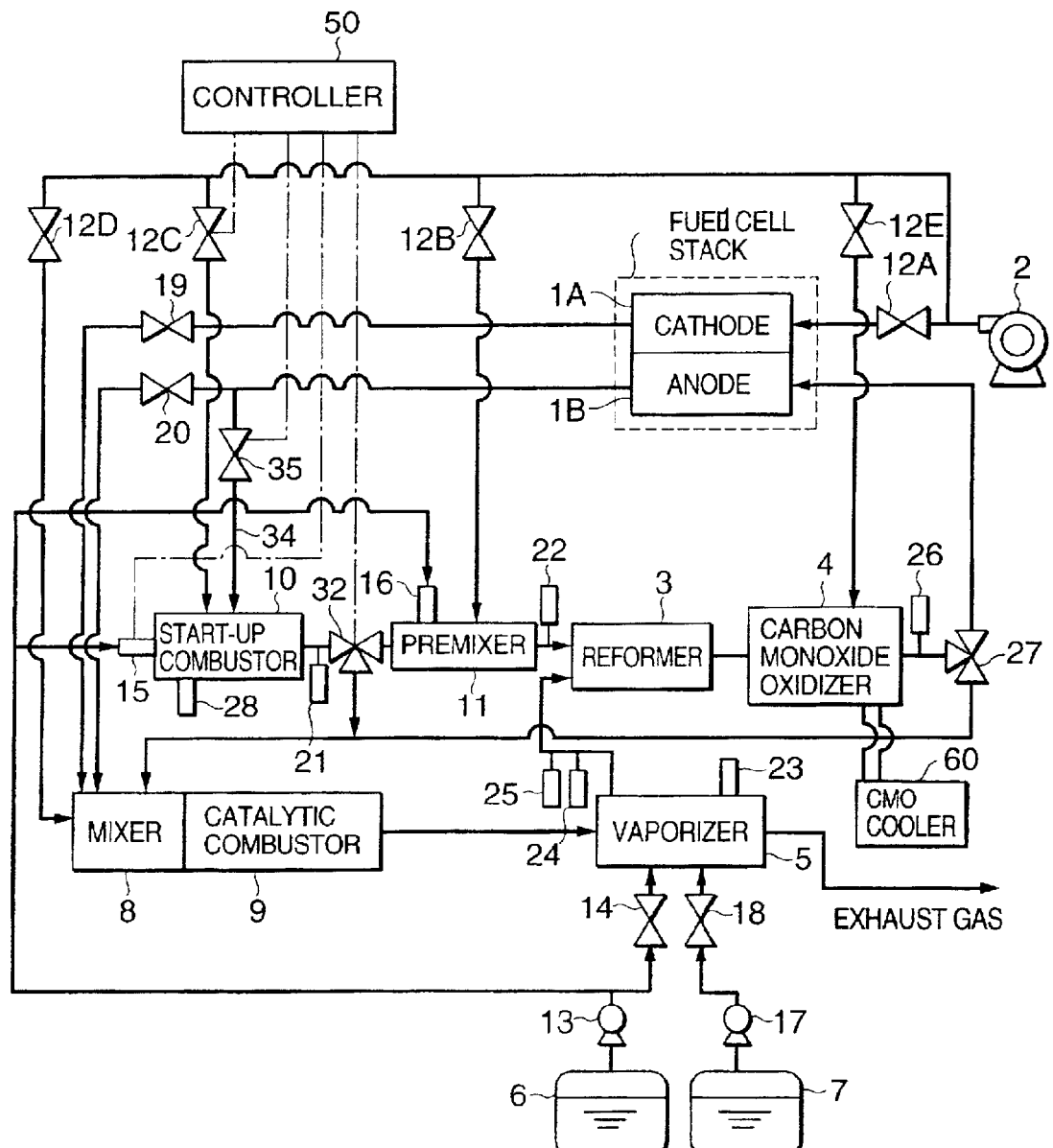
FIG. 12 is a schematic diagram of a fuel cell power plant according to a fifth embodiment of this invention.
Figure 13:
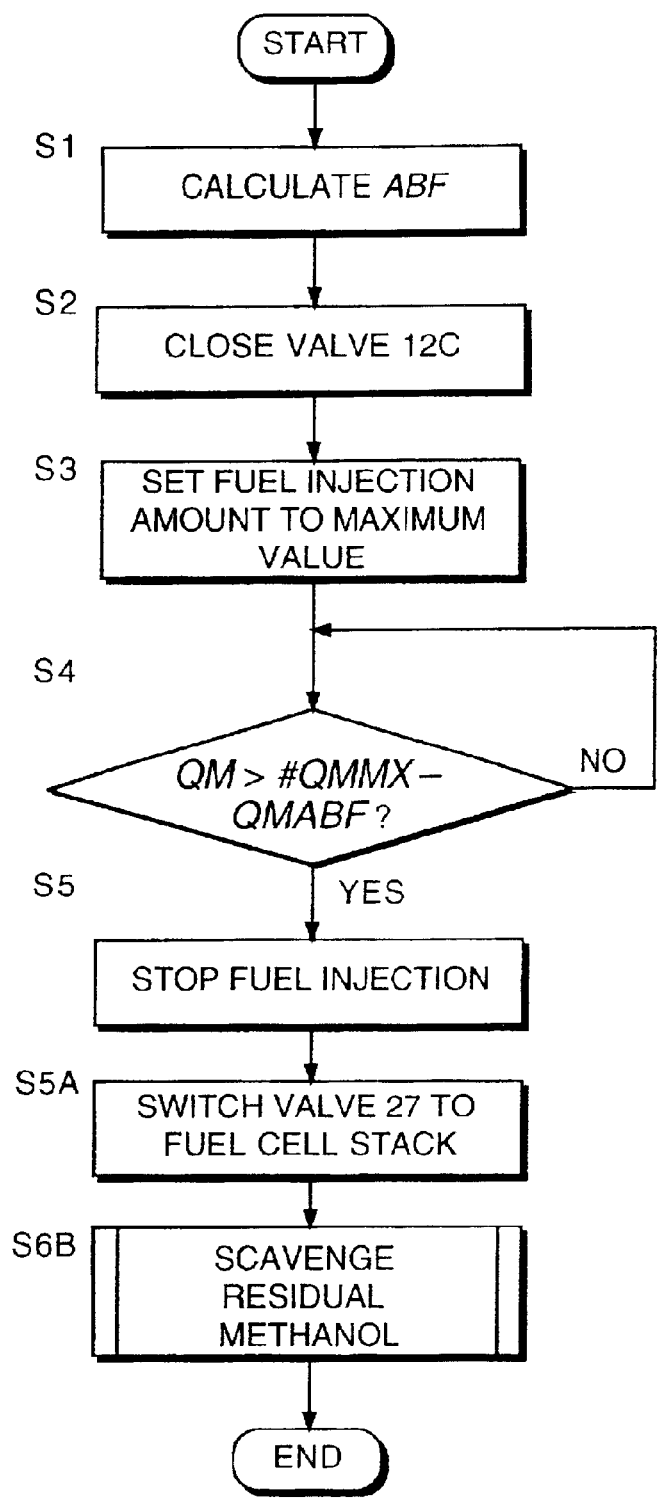
FIG. 13 is a flowchart describing a stopping routine of the start-up combustor performed by a controller according to the fifth embodiment of this invention.
Figure 14:
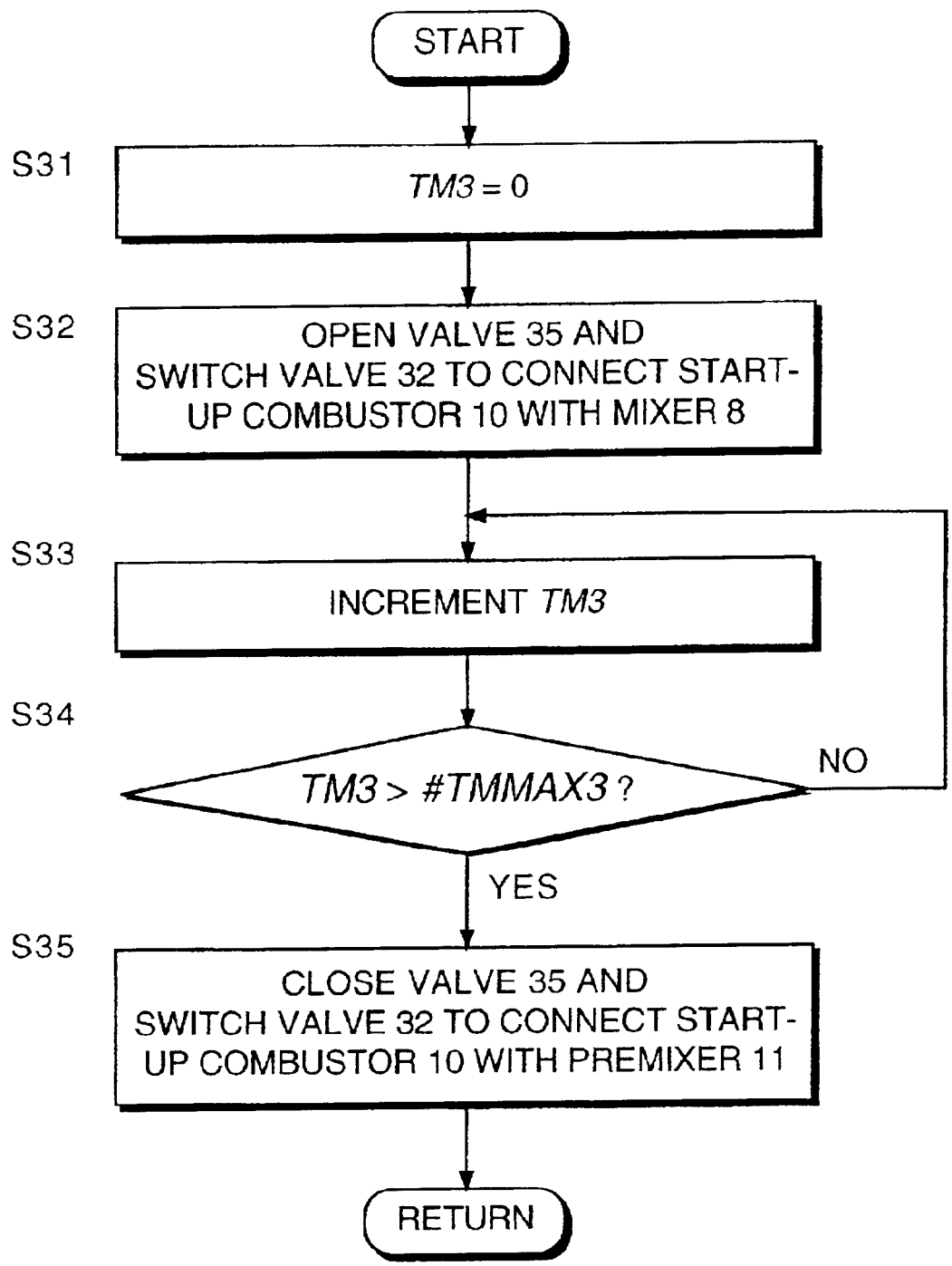
FIG. 14 is a flowchart describing a scavenging routine for residual methanol performed by the controller according to the fifth embodiment of this invention.

Referring to FIGS. 12–14, a fifth embodiment of this invention will be described.

Instead of the flow control valve 29 and the passage 30 according to the third embodiment, this embodiment provides a passage 34 and a flow control valve 35. The passage 34 is connected to the start-up combustor 10. The passage 34 is bifurcated from a passage which discharges the anode effluent of the fuel cell stack 1 to the mixer 8.

The flow control valve 35 regulates the flow amount of the passage 34. In this embodiment, the controller 50 introduces hydrogen-containing anode effluent discharged from the anode 1B of the fuel cell stack 1 into the start-up combustor 10 after stopping the injection of methanol in the start-up combustor 10. The hydrogen-containing anode effluent introduced into the start-up combustor 10 expels residual methanol in the start-up combustor 10 to the catalytic combustor 9.

The controller 50 performs a stopping routine shown in FIG. 13 when stopping operation of the start-up combustor 10.

Referring to FIG. 13, the steps S1 to S5 of this routine are the same as the routine of FIG. 2. However the controller 50 performs a step S5A after the execution of the step S5 and then performs in a subsequent step S6B a subroutine shown in FIG. 14 in order to scavenge residual methanol in the start-up combustor 10.

In the step S5A, the controller 50 switches the switching valve 27 such that the carbon monoxide oxidizer 4 is connected to the anode 1B of the fuel cell stack 1.

Next, the subroutine of FIG. 4 will be described.

First, the controller 50 resets the timer value TM3 in a step S31 to zero.

Next in a step S32, the flow control valve 35 is opened and the switching valve 32 is switched so that the start-up combustor 10 is connected to the mixer 8 via the passage 31. In a step S33, the timer value TM3 is incremented.

In a step S34, it is determined whether or not the timer value TM3 has exceeded a predetermined value #TMMAX3. The process in the steps S33 and S34 is repeated until the timer value TM3 exceeds a predetermined value #TMMAX3.

In the step S34, when the timer value TM3 has exceeded the predetermined value #TMMAX3, in a step S35, the controller 50 closes the valve 35 and switches the switching valve 32 so that the start-up combustor 10 is connected to the pre mixer 11. The subroutine is terminated after this process and the routine of FIG. 13 is terminated at the same time.

According to this embodiment, in addition to preventing temperature increase in the combustion gas immediately after stopping fuel injection in the start-up combustor 10, it is possible to prevent deterioration of operating performance or ignition characteristics of the start-up combustor 10 due to residual methanol on the next occasion when it is operated.

Figure 15:
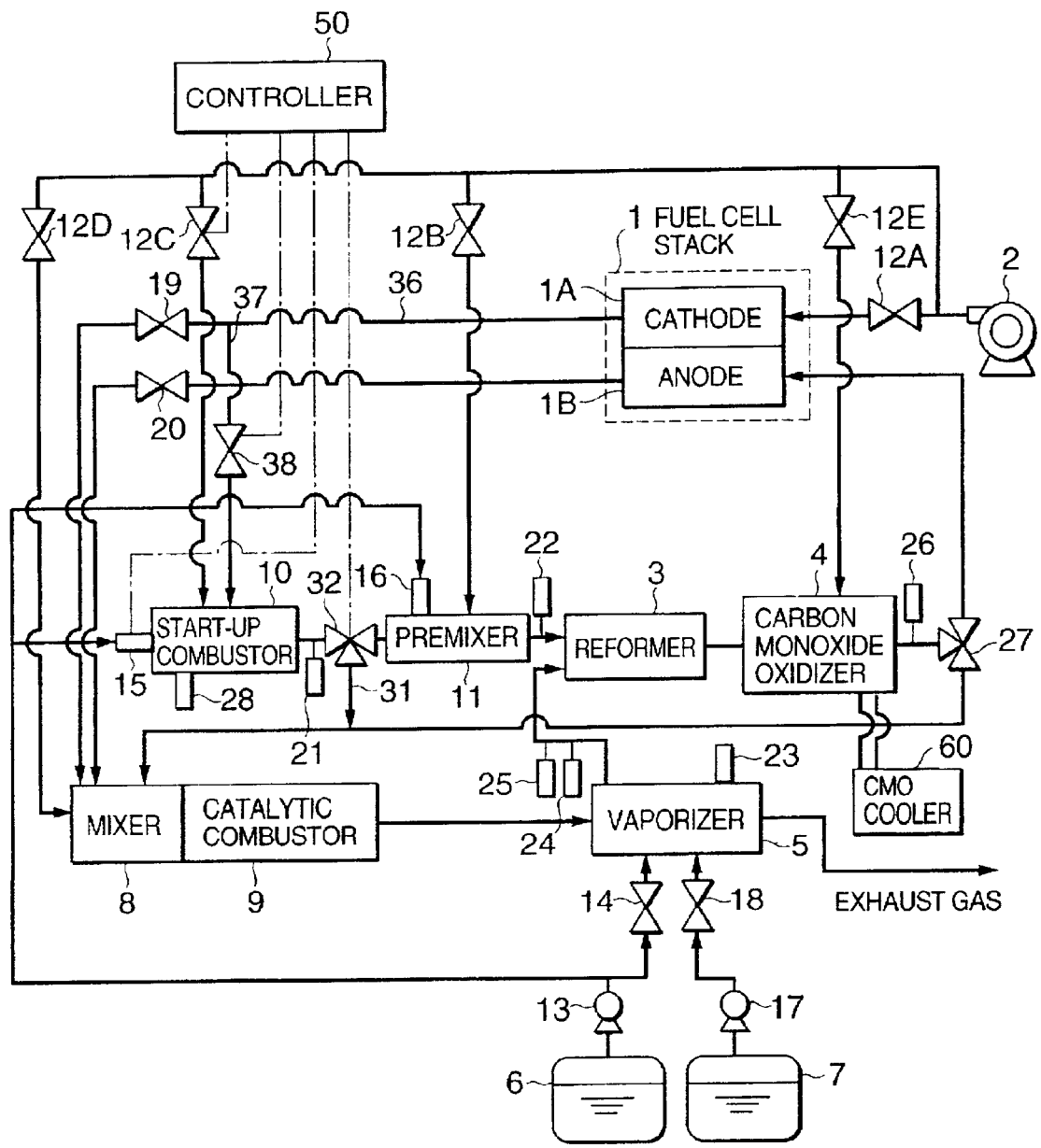
FIG. 15 is a schematic diagram of a fuel cell power plant according to a sixth embodiment of this invention.
Figure 16:
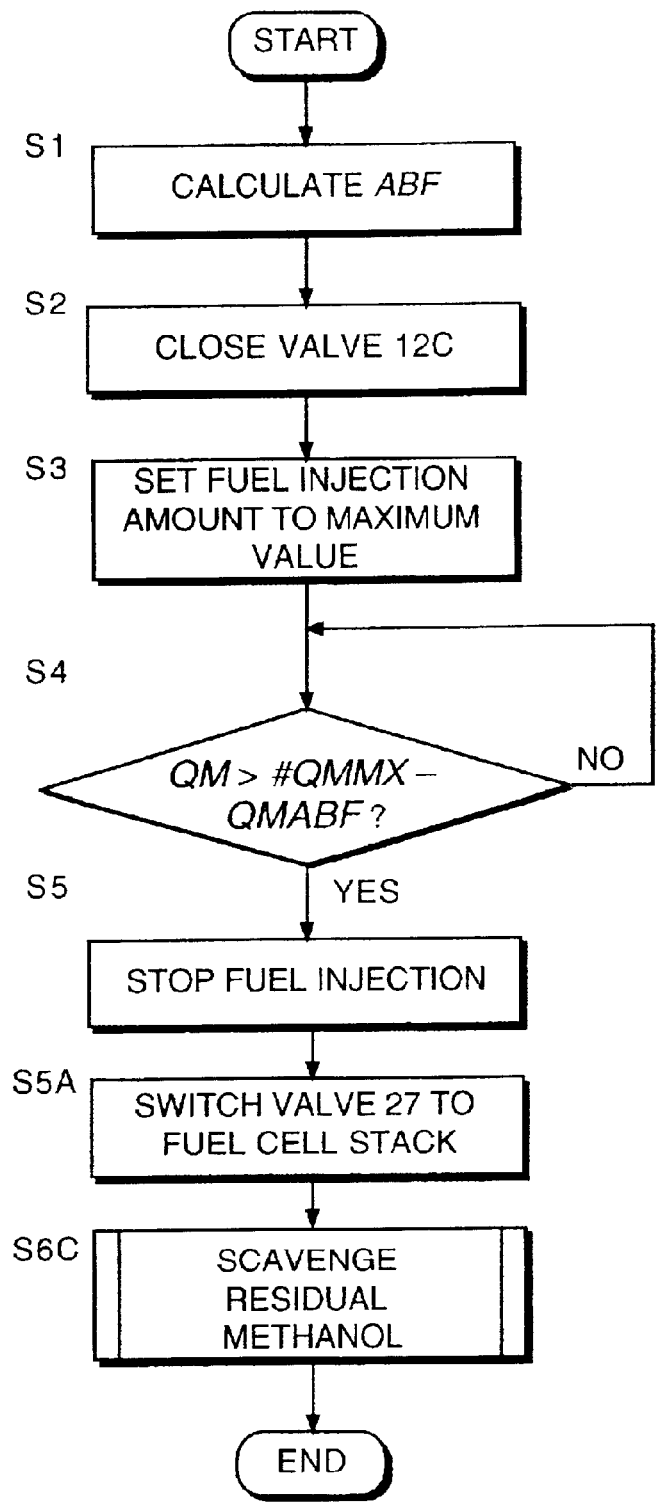
FIG. 16 is a flowchart describing a stopping routine of the start-up combustor performed by a controller according to the sixth embodiment of this invention.
Figure 17:
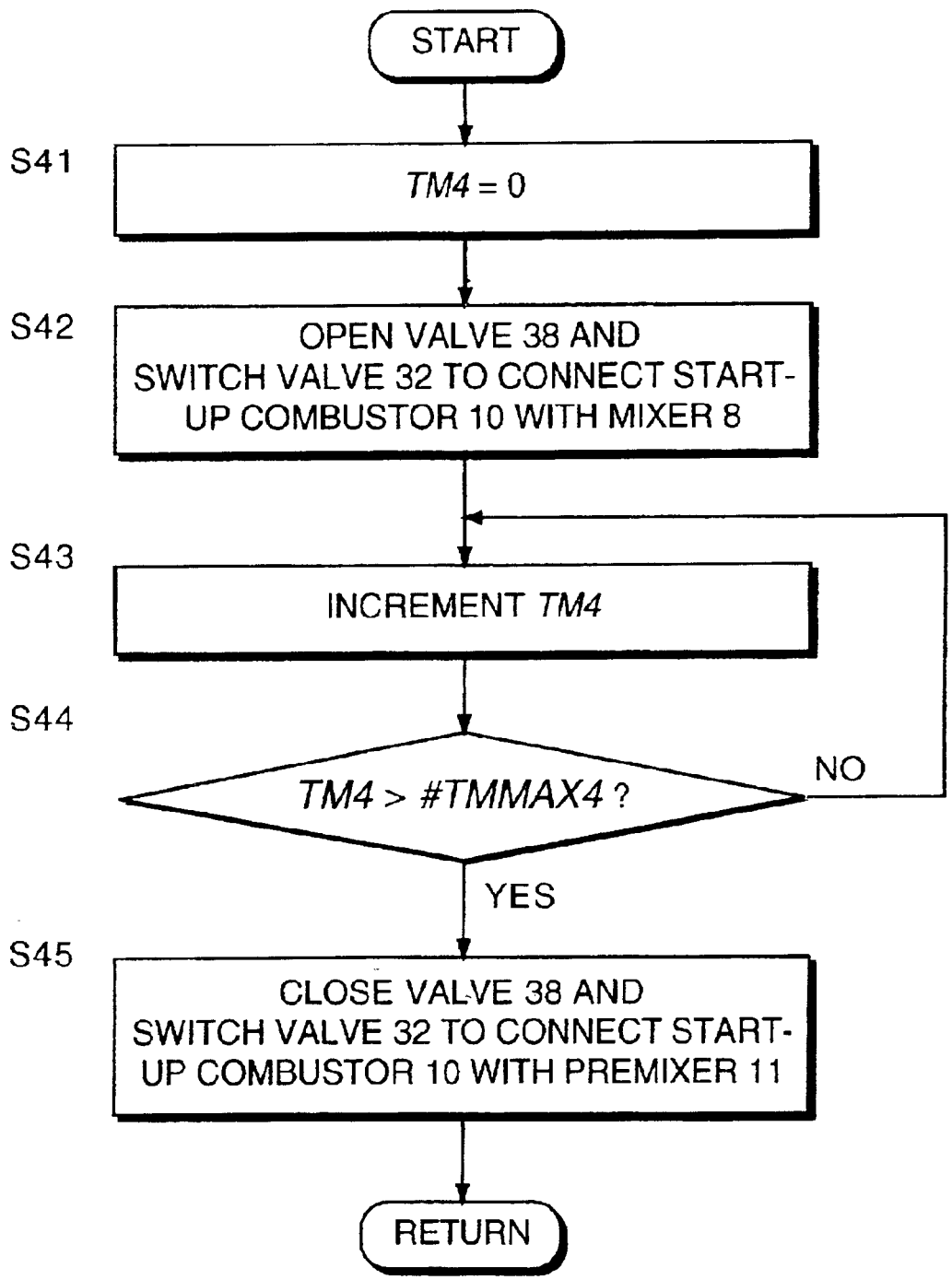
FIG. 17 is a flowchart describing a scavenging routine for residual methanol performed by the controller according to the sixth embodiment of this invention.

Referring to FIGS. 15–17, a sixth embodiment of this invention will be described.

Instead of the flow control valve 35 and the passage 34 of the fifth embodiment, this embodiment provides a passage 37 and a flow control valve 38. The passage 37 introduces hydrogen-containing anode effluent from the fuel cell stack 1 to the start-up combustor 10. The flow control valve 38 regulates the flow amount of the passage 37. Other aspects of the hardware structure in the fuel cell power plant are the same as that described with reference to the fifth embodiment.

The controller 50 performs a stopping routine shown in FIG. 16 when stopping operation of the start-up combustor 10.

Referring to FIG. 16, the process in the steps S1 to S5A is the same as the routine of FIG. 13 of the fifth embodiment. However the controller 50 performs a subroutine shown in FIG. 17 for scavenging residual methanol in the start-up combustor 10 in a step S6C after performing the processing of the step S5A.

Referring to FIG. 17, in a step S41, the controller 50 resets a timer value TM4 to zero.

Next in a step S42, the flow control valve 38 is opened and the switching valve 32 is switched so that the start-up combustor 10 is connected to the mixer 8 via the passage 31. In a step S43, the timer value TM4 is incremented.

In a step S44, it is determined whether or not the timer value TM4 has exceeded a predetermined value #TMMAX4. The process in the steps S43 and S44 is repeated until the timer value TM4 exceeds a predetermined value #TMMAX4. In the step S44, when the timer value TM4 has exceeded the predetermined value #TMMAX4, the controller 50 closes the valve 38 and switches the switching valve 32 in a step S45 so that the start-up combustor 10 is connected to the premixer 11. The subroutine is terminated after this process and the routine of FIG. 16 is terminated at the same time.

According to this embodiment, after the start-up combustor 10 stops combustion with the air-fuel ratio at the rich combustion limit, hydrogen-containing anode effluent from the anode 1B is supplied to the start-up combustor 10. The hydrogen-containing anode effluent expels residual methanol in the start-up combustor 10 to the mixer 8.

According to this embodiment, therefore, in addition to preventing temperature increase in the combustion gas immediately after stopping fuel injection in the start-up combustor 10, it is possible to prevent deterioration of operating performance or ignition characteristics of the start-up combustor 10 due to residual methanol on the next occasion when it is operated.

Referring to FIG. 18, FIGS. 19A–19C and FIG. 20, a seventh embodiment of this invention will be described.

Figure 20:
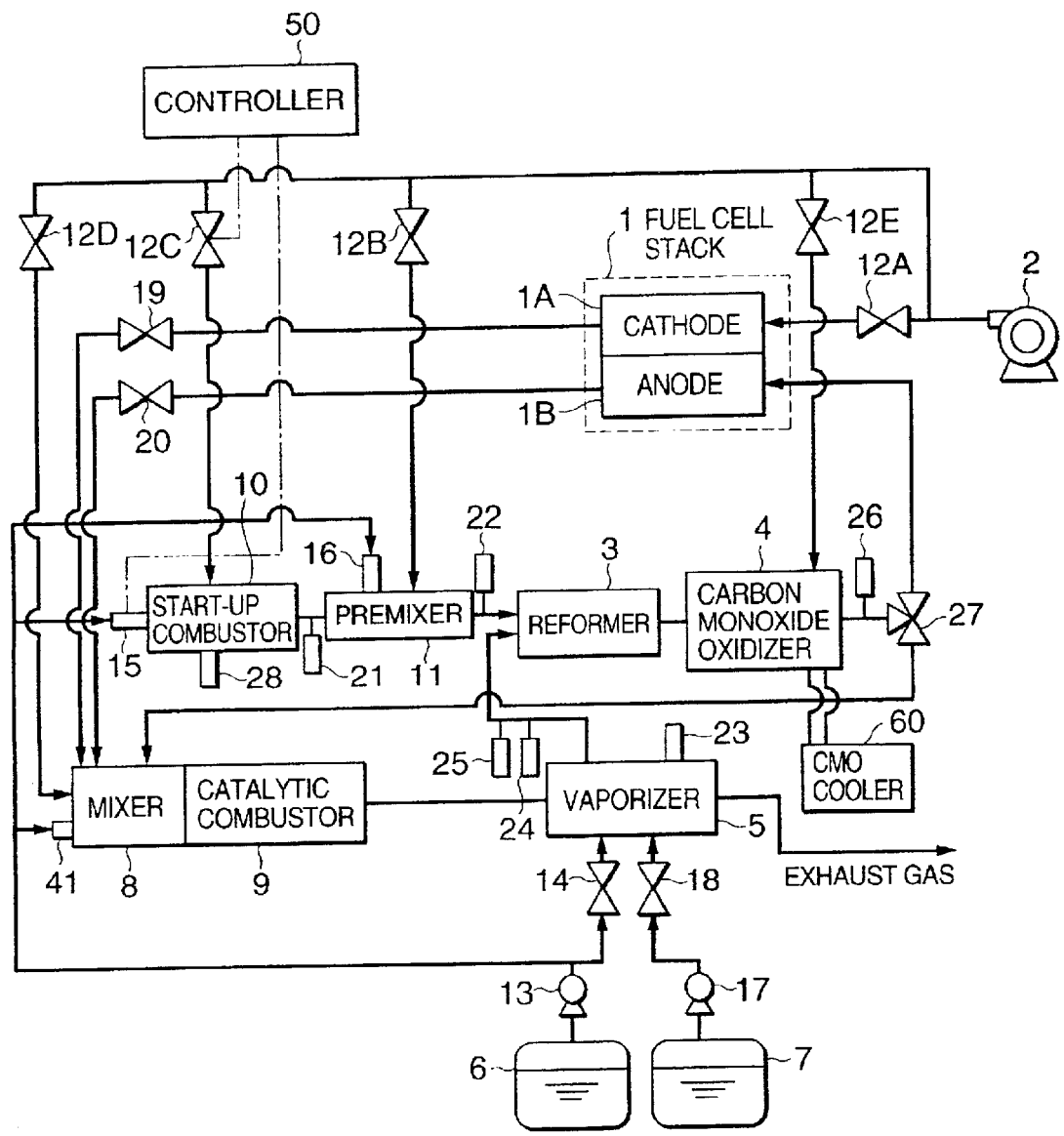
FIG. 20 is a schematic diagram of a fuel cell power plant according to a seventh embodiment of this invention.

The hardware construction of the fuel cell power plant according to this embodiment is shown in FIG. 20. It is mostly the same as that described with reference to the first embodiment. However, the seventh embodiment has a fuel injector 41 connected to the fuel supply line which is connected to the methanol tank 6. The fuel injector 41 is disposed on the mixer 8 and injects methanol therein.

In the first-sixth embodiments, the start-up combustor 10 is operated at a rich air-fuel ratio. However in the seventh embodiment, the start-up combustor 10 is operated at a lean air-fuel ratio, and the process to start-up the power plant is carried on as follows.

At first, the start-up combustor 10 starts operating as is described in the first embodiment, except that the air-fuel mixture to be combusted therein is the lean air-methanol mixture, and also except that the fuel injector 16 does not supply methanol to the premixer 11.

The combustion gas discharged from the start-up combustor 10 warms up the reformer 3, the carbon monoxide oxidizer 4, the catalytic combustor 9, and the vaporizer 5.

The controller 50 stops combustion in the start-up combustor 10 when it is determined that the power plant is sufficiently warmed up according to the output signal of the temperature sensor 23 disposed on the vaporizer 5. Specifically, The controller 50 performs a stopping routine shown in FIG. 18 instead of the routine shown in FIG. 2 of the first embodiment when stopping operation of the start-up combustor 10. At the same time, the controller 50 temporarily stops supplying air to the premixer 11 and the carbon monoxide oxidizer 4 by closing the valve 12B and 12E.

Figure 18:
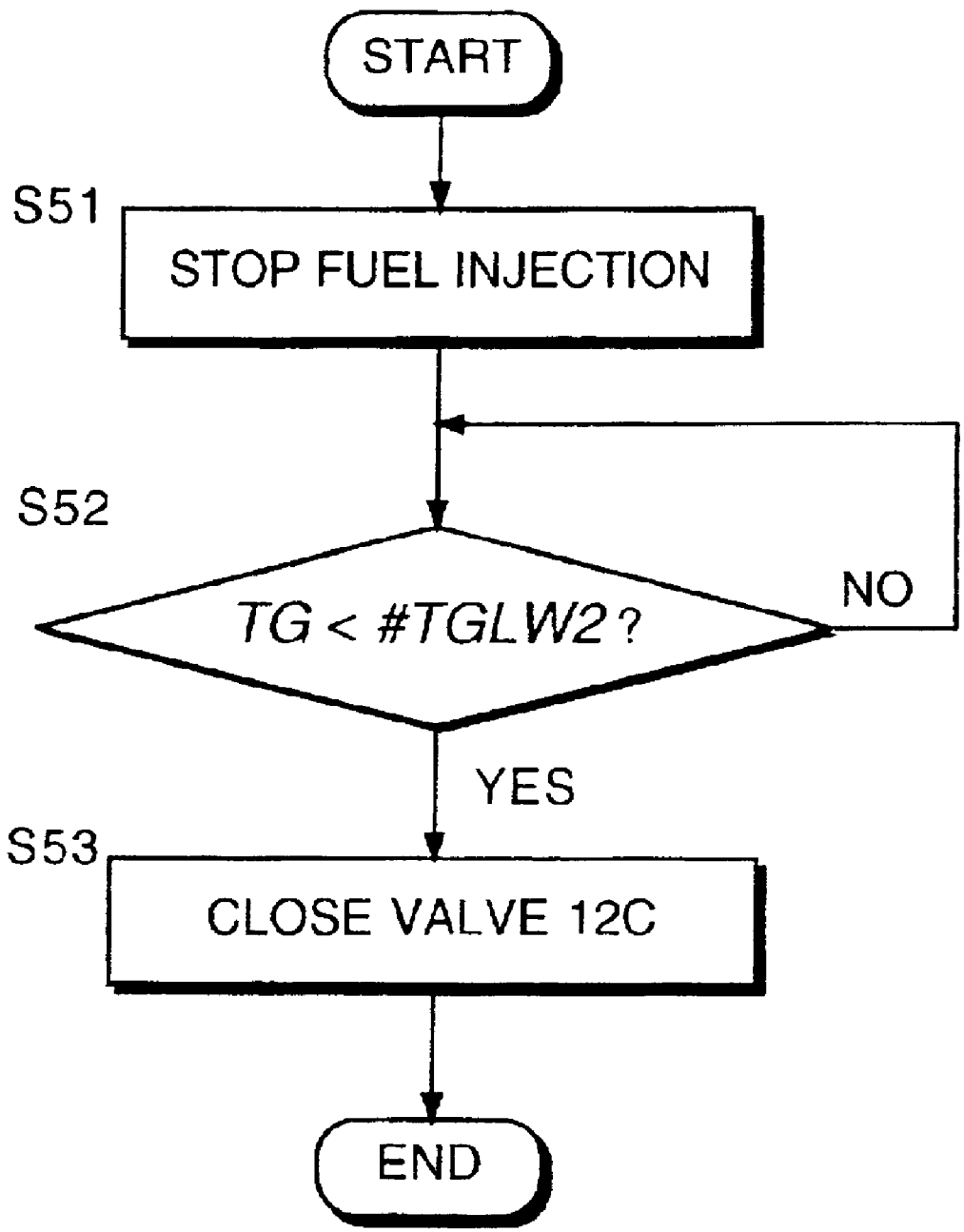
FIG. 18 is a flowchart describing a fuel injection stopping routine performed by a controller according to a seventh embodiment of this invention.

Referring to FIG. 18, firstly the controller 50 stops fuel injection by the fuel injector 15 in a step S51.

Then in a step S52, the controller 50 compares the temperature TG of the combustion gas input from the temperature sensor 21 with a predetermined temperature #TGLW2. The predetermined temperature #TGLW2 corresponds to the self-ignition temperature of the gaseous mixture. When the temperature TG of the combustion gas is lower than the self-combustion temperature, the gaseous mixture does not ignite. In the step S52, the controller 50 maintains this state until the combustion gas temperature TG becomes lower than the predetermined temperature #TGLW.

When the combustion gas temperature TG is less than the predetermined temperature #TGLW2, the controller 50 closes the valve 12C in a step S53 and terminates the routine.

Figure 19A:
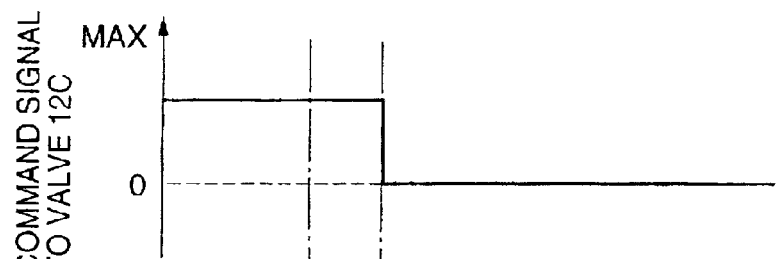
FIGS. 19A–19C are timing charts describing gas temperature variation in the start-up combustor due to the execution of the routine of FIG. 18.
Figure 19B:
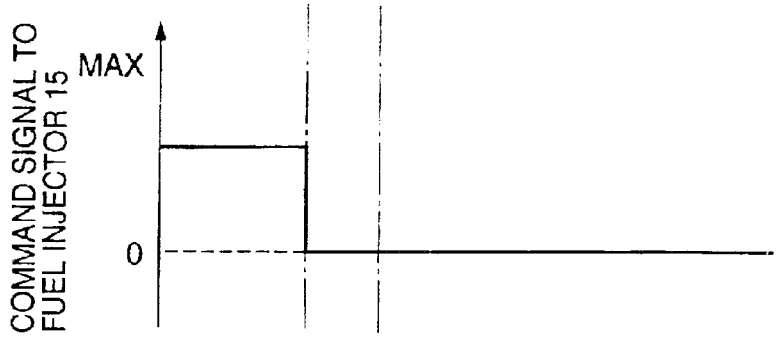

According to this embodiment, while the start-up combustor 10 is warming up the reformer 3, the controller outputs a command signal to the valve 12C to maintain a predetermined opening as shown in FIG. 19A, and outputs a command signal to the fuel injector 15 to inject a predetermined amount of fuel as shown in FIG. 19B so that a predetermined lean air-fuel ratio is maintained.

Figure 19C:
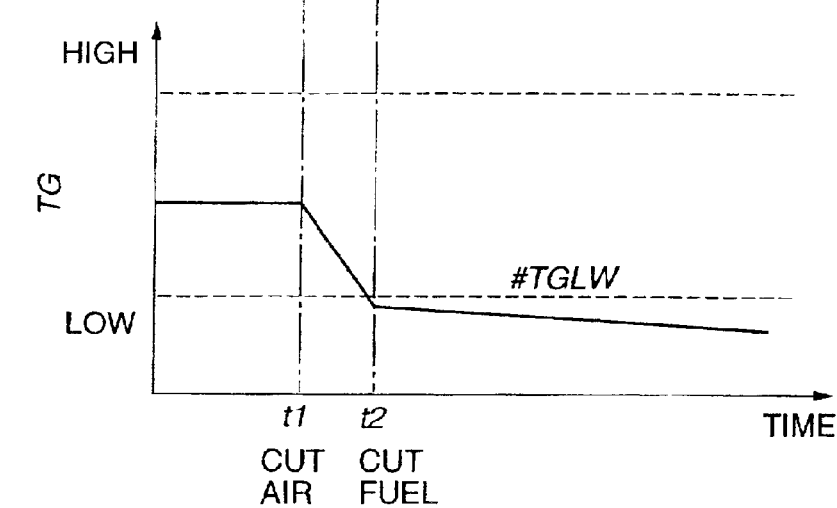

With this lean air-fuel ratio, the start-up combustor 10 combusts methanol and generates a combustion gas with a predetermined high temperature as shown in FIG. 19C.

At a time t1, when the reforming cycle is established, the controller 50 stops the fuel injection by the fuel injector 15. After stopping fuel injection, there is residual methanol in the combustion chamber of the start-up combustor 10. The residual methanol is combusted with air supplied from the valve 12C.

Since the air amount supplied by the valve 12C to the start-up combustor 10 remains constant after the time t1, the air-fuel ratio in the start-up combustor 10 becomes leaner until the air-fuel ratio finally reaches the lean combustion limit and combustion stops. The lean combustion limit of methanol corresponds to the air-fuel ratio of approximately 14.

In this embodiment, the start-up combustor 1 is operated at a lean air-fuel ratio until combustion stops, Thus after a time t1 at which the fuel injection is stopped, the temperature of the start-up combustor 10 starts to decrease as a result of decrease in the combusted methanol amount, and finally combustion stops.

At a time t2, at which the temperature has become lower than the self-ignition temperature, the controller closes the valve 12C.

According to this embodiment, since the start-up combustor 10 normally maintains a lean air-fuel ratio from normal operation up until stopping combustion, the combustion gas does not undergo a temporary temperature increase after fuel injection stops.

Thus there is no possibility that the temperature of the already-activated reforming catalyst in the reformer 3 will exceed the activation temperature range as a result of high temperature combustion gas produced when the start-up combustor 10 stops operation.

After the controller 50 performs the stopping routine shown in FIG. 18, the mixer 8 mixes the air supplied through the valve 12D and the methanol supplied by the fuel injector 41 to make the lean air-fuel mixture, and supplies the lean air-fuel mixture to the catalytic combustor 9. The catalytic combustor 9 carries out the oxidation reactions to make the hot combustion gas and supplies it to the vaporizer 5.

The vaporizer 5 vaporizes the methanol supplied through the flow control valve 14 and the water supplied through the flow control valve 17 utilizing the heat of the hot combustion gas. The vaporizer 5 then supplies the resulting gaseous mixture of methanol and water to the reformer 3.

The gaseous mixture of methanol and water purges air in the reformer 3 and the carbon monoxide oxidizer 4, and the purged air flows into the catalytic combustor 9. The gaseous mixture is finally combusted in the catalytic combustor 9. The controller 50 determines the establishment of the reforming cycle of the reformer 3 from an increase of the output signal of the temperature sensor 23 which senses the temperature of the combustion gas.

When it has been determined that the reforming cycle are established, the power plant finishes its warm-up and is thereafter operated as same as the first embodiment.

The contents of Tokugan 2001-107919 with a filing date of Apr. 6, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fuel cell power plant performing power generation using a hydrogen-containing reformate gas, comprising:
    a reformer comprising a reforming catalyst which generates the hydrogen-containing reformate gas from a source material in a predetermined activation temperature range;
    a start-up combustor which combusts a gaseous mixture of fuel and air and supplies a resultant combustion gas to the reformer to warm up the reformer to the activation temperature range;
    an air supply device which supplies air to the start-up combustor;
    a fuel supply device which supplies fuel to the start-up combustor;
    a sensor which detects completion of warming up of the reformer; and
    a programmable controller programmed to:
        control a fuel supply amount of the fuel supply device and an air supply amount of the air supply device to maintain an air-fuel ratio of the gaseous mixture at a specific rich air-fuel ratio with respect to a stoichiometric air-fuel ratio; and
        control the fuel supply amount of the fuel supply device and the air supply amount of the air supply device to cause a difference of the stoichiometric air-fuel ratio and the air-fuel ratio of the gaseous mixture to be greater than a difference of the specific rich air-fuel ratio and the stoichiometric air-fuel ratio, in the period after completion of warming up of the reformer until a combustion of the gaseous mixture terminates, by stopping air supply of the air supply device after completion of warming up of the reformer, and by stopping fuel supply of the fuel supply device at a timing later than a timing where the air supply device stops air supply to the start-up combustor.

2. The fuel cell power plant as defined in claim 1, wherein the controller is further programmed to temporarily increase the fuel supply amount of the fuel supply device after the air supply device stops air supply.

3. The fuel cell power plant as defined in claim 2, wherein the controller is further programmed to increase the fuel supply amount of the fuel supply device until the air-fuel ratio of the gaseous mixture in the start-up combustor reaches a rich combustion limit.

4. The fuel cell power plant as defined in claim 1, wherein the fuel cell power plant further comprises a sensor which detects a temperature of the combustion gas, and the controller is further programmed to stop fuel supply of the fuel supply device after the temperature of the combustion gas has become lower than a self-ignition temperature of the gaseous mixture.

5. The fuel cell power plant as defined in claim 1, wherein the power plant further comprises a scavenging mechanism which supplies scavenging gas to the start-up combustor for scavenging residual gaseous mixture in the start-up combustor, after stopping fuel supply of the fuel supply device.

6. The fuel cell power plant as defined in claim 5, wherein the fuel cell power plant further comprises a vaporizer which supplies a vapor of the source material to the reformer, a catalytic combustor which produces a combustion gas to heat the vaporizer, and a passage which supplies a gaseous mixture scavenged from the start-up combustor by the scavenging mechanism to the catalytic combustor.

7. The fuel cell power plant as defined in claim 5, wherein the scavenging mechanism comprises a valve which supplies the hydrogen-containing reformate gas produced by the reformer to the start-up combustor as the scavenging gas.

8. The fuel cell power plant as defined in claim 5, wherein the scavenging mechanism comprises the controller further programmed to control the air supply device to supply air to the start-up combustor as the scavenging gas after stopping fuel supply of the fuel supply device.

9. The fuel cell power plant as defined in claim 5, wherein the fuel cell power plant further comprises a fuel cell stack which comprises a cathode and an anode, and generates an electric power by a reaction between air supplied to the cathode and the hydrogen-containing reformate gas supplied to the anode, the anode producing a hydrogen-containing anode effluent as a result of the reaction, and the scavenging mechanism comprises a valve which supplies the hydrogen-containing anode effluent from the anode to the start-up combustor as the scavenging gas.

10. The fuel cell power plant as defined in claim 5, wherein the fuel cell power plant further comprises a fuel cell stack which comprises a cathode and an anode, and generates an electric power by a reaction between air supplied to the cathode and the hydrogen-containing reformate gas supplied to the anode, the cathode producing an oxygen-containing cathode effluent as a result of the reaction, and the scavenging mechanism comprises a valve which supplies the oxygen-containing cathode effluent from the cathode to the start-up combustor as the scavenging gas.

11. The fuel cell power plant as defined in claim 1, wherein the programmable controller is programmed to:
   stop air supply of the air supply device after completion of warm up of the reformer; and
   control the fuel supply device to temporarily increase the fuel supply amount of the fuel supply device until stopping fuel supply of the fuel supply device.

12. A fuel cell power plant performing power generation using a hydrogen-containing reformate gas, comprising:
   a reformer comprising a reforming catalyst which generates the hydrogen-containing reformate gas from a source material in a predetermined activation temperature range;
   a start-up combustor which combusts a gaseous mixture of fuel and air and supplies a resultant combustion gas to the reformer to warm up the reformer to the activation temperature range;
   an air supply device which supplies air to the start-up combustor;
   a fuel supply device which supplies fuel to the start-up combustor;
   a sensor which detects completion of warming up of the reformer; and
   a programmable controller programmed to;
   control a fuel supply amount of the fuel supply device and an air supply amount of the air supply device to maintain an air-fuel ratio of the gaseous mixture at a specific lean air-fuel ratio with respect to a stoichiometri air-fuel ratio;
   stop fuel supply of the fuel supply device after completion of warming up of the reformer, and
   stop air supply of the air supply device at a timing later than a timing where the fuel supply device stops fuel supply to the start-up combustor.

13. The fuel cell power plant as defined in claim 12, wherein the fuel cell power plant further comprises a sensor which detects a temperature of the combustion gas, and the controller is further programmed to stop air supply of the air supply device after the temperature of the combustion gas has become lower than a self-ignition temperature of the gaseous mixture.

14. A control method for a fuel cell power plant performing power generation using a hydrogen-containing reformate gas, the fuel cell power plant comprising a reformer comprising a reforming catalyst which generates the hydrogen-containing reformate gas from a source material in a predetermined activation temperature range, a start-up combustor which combusts a gaseous mixture of fuel and air and supplies a resultant combustion gas to the reformer to warm up the reformer to the activation temperature range, an air supply device which supplies air to the start-up combustor, and a fuel supply device which supplies fuel to the start-up combustor, the method comprising:
   detecting completion of warming up of the reformer;
   controlling a fuel supply amount of the fuel supply device and an air supply amount of the air supply to maintain an air-fuel ratio of the gaseous mixture at a specific rich air-fuel ratio with respect to a stoichiometric air-fuel ratio; and
   controlling the fuel supply amount of the fuel supply device and the air supply amount of the air supply device to cause a difference of the stoichiometric air-fuel ratio and the air-fuel ratio of the gaseous mixture to be greater than a difference of the specific rich air-fuel ratio and the stoichiometric air-fuel ratio, in the period after completion of warming up of the reformer until a combustion of the gaseous mixture terminates, by stopping air supply of the air supply device after completion of warming up of the reformer, and by stopping fuel supply of the fuel supply device at a timing later than a timing where the air supply device stops air supply to the start-up combustor.

* * * * *